US009655124B2

United States Patent
Mahkonen et al.

(10) Patent No.: US 9,655,124 B2
(45) Date of Patent: May 16, 2017

(54) POLICY AND CHARGING CONTROL (PCC) FOR NAT64 AND DNS64

(75) Inventors: Heikki Mahkonen, Santa Clara, CA (US); Jan Melén, Espoo (FI)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 215 days.

(21) Appl. No.: 14/368,433

(22) PCT Filed: Dec. 30, 2011

(86) PCT No.: PCT/EP2011/074328
§ 371 (c)(1),
(2), (4) Date: Jul. 29, 2014

(87) PCT Pub. No.: WO2013/097910
PCT Pub. Date: Jul. 4, 2013

(65) Prior Publication Data
US 2014/0376470 A1   Dec. 25, 2014

(51) Int. Cl.
*H04W 72/04* (2009.01)
*H04W 8/02* (2009.01)
(Continued)

(52) U.S. Cl.
CPC ....... *H04W 72/048* (2013.01); *H04L 61/1511* (2013.01); *H04L 61/251* (2013.01);
(Continued)

(58) Field of Classification Search
CPC combination set(s) only.
See application file for complete search history.

(56) References Cited

U.S. PATENT DOCUMENTS

| 2011/0292857 A1* | 12/2011 | Sarikaya | H04L 29/12358 370/312 |
| 2014/0095686 A1* | 4/2014 | Zhou | H04L 61/2503 709/223 |

FOREIGN PATENT DOCUMENTS

WO   WO 2011144083 A2 *  11/2011  ......... H04L 61/2503

OTHER PUBLICATIONS

International Search Report for PCT Application No. PCT/EP2011/074328 mailed Nov. 27, 2012, 3 pages.
(Continued)

*Primary Examiner* — Yee Lam
(74) *Attorney, Agent, or Firm* — Patents on Demand P.A.; Brian K. Burchheit; Scott M. Garrett

(57) ABSTRACT

A mechanism for use by a subscription control node, one or more NAT64 nodes and/or DNS64 nodes to interact in a communications network with multiple user equipments (UEs) to control the UE usage of the NAT64 and/or DNS64 communications resources. The subscription control node includes subscription information for one or more of the UE(s), the subscription information for each UE including translation state usage information associated with one or more of the NAT64 nodes servicing the UE. The subscription control node collects translation state usage information from each NAT64 node, and identifies a set of one or more UE(s) exceeding a maximum translation state usage allocated to each of the multiple UEs based on the corresponding subscription information and the collected translation state usage information. The subscription information for the identified UEs is adjusted so the identified set of UE(s) meet the maximum translation state usage for each UE.

15 Claims, 11 Drawing Sheets

(51) Int. Cl.
*H04W 8/18* (2009.01)
*H04W 8/26* (2009.01)
*H04L 29/12* (2006.01)
*H04L 29/06* (2006.01)

(52) U.S. Cl.
CPC ........ *H04L 61/255* (2013.01); *H04L 61/2532* (2013.01); *H04L 69/167* (2013.01); *H04W 8/02* (2013.01); *H04W 8/18* (2013.01); *H04W 8/26* (2013.01)

(56) References Cited

OTHER PUBLICATIONS

Written Opinion of the International Searching Authority for PCT Application No. PCT/EP2011/074328 mailed Nov. 27, 2012, 12 pages.

ZTE: "Impacts to the policy architecture when deploying NAT", 3GPP Draft; TD S2-104509_NAT_PCC, 3rd Generation Partnership Project (3GPP), Mobile Competence Centre; 650, Route Des Lucioles; F-06921 Sophia-Antipolis Cedex; Franch, vol. SA WG2 Meeting #81 Oct. 11-15, 2010, Prague, Czech Republic; XP050459449; 12 pg.

Schoenwaelder et al.: "Extension of the NAT-MIB to support NAT64 and CGN (and DS-Lite); draft-schoenw-behave-nat-mib-bis-00.txt", draft-schoenw-behave-nat-mib-is-00.txt, Internet Engineering Task Force, IETF; Standardworkingdraft, Internet Society (ISOC) 4, Rue Des Falaises CH-1205 Geneva, Switzerland, Jul. 4, 2011, pp. 1-7, XP015076906.

Dionne J et al.: "CGN Management Information Base (MIB); draft-jpdionne-behave-cgn-mib-00.txt", draft-jpdionne-behave-cgn-mib-00.txt, Internet Engineering Task Force, IETF; Standardworkingdraft, Internet Society (ISOC) 4, Rue Des Falaises CH-1205 Geneva, Switzerland, Jul. 3, 2011, pp. 1-10, XP015076818.

Bagnulo et al.: "Stateful NAT64; Network Address and Protocol Translation from IPv6 Clients to IPv4 Servers; rfc6146.txt", Internet Engineering Task Force, IETF; Standard, Internet Society (ISOC) 4, Rue Des Falaises CH-1205 Geneva, Switzerland, Apr. 27, 2011, pp. 1-45, XP015075988.

Bagnulo et al.: "DNS64: DNS Extensions for Network Address Translation from IPv6 Clients to IPv4 Servers" rfc6147 (2), Internet Engineering Task Force, IETF; Standard, Internet Society (ISOC) 4, Rue Des Falaises CH-1205 Geneva, Switzerland, Apr. 2011, pp. 1-29.

Zhang et al.: "Considerations on NAT64 Load-Balancing; draft-zhang-behave-nat64-load-balancing-03.txt", Internet Engineering Task Force, IETF; Standardworkingdraft, Internet Society (ISOC) 4, Rue Des Falaises CH-1205 Geneva, Switzerland, No. 3, Jul. 11, 2011, pp. 1-16, XP015077350.

3GPP TS 23.203 V11.3.0 (Sep. 2011) 3rd Generation Partnership Project; Technical Specification Group Services and System Aspects; Policy and charging control architecture (Release 11); 167 pages.

3GPP TR 23.975 V11.0.0 (Jun. 2011) 3rd Generation Partnership Project; Technical Specification Group Services and System Aspects; IPv6 Migration Guidelines (Release 11); 41 pages.

* cited by examiner

POLICY AND CHARGING CONTROL (PCC) FOR NAT64 AND DNS64

CROSS REFERENCE TO RELATED APPLICATION

This application is a 35 U.S.C. §371 national stage application of PCT International Application No. PCT/EP2011/074328, filed on 30 Dec. 2011, the disclosure of which is incorporated by reference herein in its entirety. The above-referenced PCT International Application was published in the English language as International Publication No. WO 2013/097910 A1 on 4 Jul. 2013.

TECHNICAL FIELD

The present invention relates to methods and apparatus for monitoring and controlling the user equipment usage of Network Address Translation Internet Protocol version 6 to Internet Protocol version 4 (NAT64) and/or Domain Name System 64 (DNS64) communication resources in a communication network. In particular, the present invention relates to methods and apparatus for operating a subscriber control node, a NAT64 node and/or a DNS64 node to interact with each other for monitoring and controlling the UE usage of the NAT64 and DNS64 communication resources.

BACKGROUND

Due to the Internet Protocol version 4 (IPv4) network address space becoming exhausted, communications network operators are moving to deploy Internet Protocol version 6 (IPv6) networks. The Third Generation Partnership Project (3GPP) have defined standards for specifying possible migration techniques for operators when changing their mobile core networks from IPv4 to IPv6. However, as the majority of mobile core networks, and other communication networks such as the Internet, are still based on IPv4 addressing, the 3GPP have specified a NAT64 node for translating the UE traffic from IPv6 addresses to IPv4 addresses used by current communications networks and Internet services.

A UE may comprise or represent any device used for communications. Examples of user equipment that may be used in certain embodiments of the described access networks are wireless devices such as mobile phones, terminals, smart phones, portable computing devices such as lap tops, handheld devices, tablets, net-books, computers, personal digital assistants and other wireless communication devices.

UEs attached to the mobile core network will use IPv6 addressing such that all the traffic to and from each UE is using IPv6 addresses. In order for the UE to access certain services in the Internet it will try to resolve the IPv6 address of the service via a DNS64 node. The UE sends the uniform resource locator (URL) of the service to the DNS64 node. The DNS64 node will try to resolve both IPv4 and IPv6 addresses for the given URL. If an IPv6 address is returned then the UE simply uses the native IPv6 connectivity for using the service. However, if only an IPv4 address is returned for the given URL, then the DNS64 node will synthesize an IPv6 address for the service. The synthesized IPv6 address will hold the 32 bit IPv4 address of the resolved service in the host part of the IPv6 address. The network part of the synthesized IPv6 address will hold the so-called prefix64 of a NAT64 node, which will perform the address family translation for the connection. The synthesized IPv6 address is returned to the UE by the DNS64 node as a reply to the URL resolve request. As a result, the UE will initiate communication to the service by using the synthesized IPv6 address.

All packets sent by the UE to a synthesized IPv6 address will be routed to the NAT64 node associated with the prefix64 of the IPv6 address. When the NAT64 node receives the first IPv6 packet destined to the IPv4 service it will create a translation state for this service. The translation state includes inner and outer 5-tuples, in which each 5-tuple holds the used upper layer protocol, protocol ports (or other info) and the destination and source addresses. The inner 5-tuple will hold IPv6 addresses used by the UE (source=UE address, destination=synthesized IPv6 address). The outer 5-tuple will have IPv4 addresses (source=IPv4 address from global address pool of NAT64, destination=IPv4 address from the host part of the synthesized IPv6 address). After a NAT64 translation state has been created it can be used to translate the incoming and outgoing packets.

3GPP mobile core networks have a Policy and Charging Control (PCC) architecture for providing a fair allocation of resources to all UEs attached to the communications network and to gather charging information about the resources used. The PCC architecture holds subscriber information of all the UEs in a Subscriber Policy Repository (SPR) node. The PCC architecture also includes a Policy and Charging Resource Function (PCRF), which is responsible for configuring UE specific quality of service (QoS) settings to an IP-Connectivity Access Network (IP-CAN) bearer session used for carrying the UE traffic. When UEs create new IP-CAN bearer sessions the PCRF node will acquire the subscription information from the SPR node via a Sp reference point and set policies matching the subscription information to use in a packet data network gateway (PDN GVV) via a Gx reference point. The PDN GW a Policy and Charging Enforcement Function (PCEF) node is responsible for controlling the QoS settings for the IP-CAN bearer session dedicated to the UE.

In a NAT64 node, the size of the translation state table or list for all UEs dictates the efficiency of the NAT64 node. This is because Internet services can many connections to download small pieces of data (e.g. Google® maps where each map tile is uses its own connection). When NAT64 node functionality is used in the 3GPP networks there is currently no control over how many translation states can be created in a NAT64 node for each UE. This means that some UEs might get access to more translation states states, and hence services, than others. However, if a static maximum limit were used per UE, then some services may be rendered unusable once this limit is reached. At the same time, some UEs might never require as many states as the maximum level would allow them to use, while others may use too many states overloading the NAT64 node or reducing the performance of other UEs.

A simple solution might be to deploy more NAT64 nodes, but this may still result in an unfair distribution of translation load amongst the NAT64 nodes. In a network with multiple NAT64 nodes, it is desirable that the translation load of the NAT64 nodes is evenly distributed. There is a need to dynamically monitor and control the NAT64 and DNS64 communication resource usage amongst UEs to provide a fair usage of communication resources.

SUMMARY

It is an object of the present invention to provide a mechanism for providing a fair usage and amount of resources to all UEs in a communications network.

According to a first aspect of the invention there is provided a method for operating a subscription control node in a communications network, the communications network including multiple UEs and multiple NAT64 nodes, the subscription control node including subscription information for one or more of the UEs, the subscription information for each UE including translation state usage information associated with one or more of the NAT64 nodes servicing the UE. The method includes collecting translation state usage information from each NAT64 node and identifying a set of one or more UE(s) exceeding a maximum translation state usage allocated to each of the multiple UEs based on the corresponding subscription information and the collected translation state usage information. In addition, the method includes adjusting the translation state usage information in the subscription information of the identified set of UE(s) to meet the maximum translation state usage for each UE and updating the corresponding subscription information. The updated subscription information of the identified set of UE(s) is transmitted to the corresponding NAT64 nodes.

As an option, the step of collecting translation usage information includes receiving an update message from each NAT64 node, the update message including an indication of the current number of translation states each NAT64 node has allocated to each UE serviced by that NAT64 node. Alternatively or additionally, the step of collecting translation usage information further includes calculating, for each UE, the total number of translation states allocated to said each UE from the collected translation state usage information.

Optionally, the step of identifying the set of UE(s) further comprises including a UE in the set of UE(s) when the total number of translation states for the UE exceeds the maximum number of translation states allocated to that UE. The step of adjusting the translation state usage information in the subscription information of the identified set of UE(s) may further include adjusting the maximum number of translation states for each UE in the set of UE(s) that the corresponding NAT64 nodes can allocate for said each UE. Additionally, the method may include the step of receiving a request query from a first NAT64 node of the multiple NAT64 nodes for subscription information associated with a first UE of the multiple UEs, and transmitting the subscription information associated with the first UE to the first NAT64 node, the subscription information including the maximum number of translation states that the first NAT64 node may allocate to the first UE.

As an option, the communication network may further include DNS64 node, and the method may further include the steps of receiving, from the DNS64 node, a request for a prefix address list associated with a second UE of the multiple UEs for use in resolving a first type of IP address with a second type of IP address used in services requested by the second UE, retrieving, from the subscription information for one or more of the UEs, data representative of the prefix address list associated with the second UE, and transmitting the data representative of the prefix address list associated with the second UE to the DNS64 node.

Optionally, the step of retrieving may include transmitting a request query to a subscription information storage node for subscription information associated with the second UE, receiving and storing the subscription information associated with the second UE, and retrieving from the subscription information associated with the second UE the data representative of the prefix address list associated with the second UE.

Alternatively, there is provided the steps of transmitting a request query to a subscription information storage node for subscription information associated with one or more of the multiple UEs, and receiving and storing the subscription information associated with the one or more of the multiple UEs. Alternatively or additionally, the method may further include the step of transmitting subscription information for one or more of the UEs to associated NAT64 nodes. In addition, there is provided the step of transmitting updated subscription information to the subscription information storage node, the updated subscription information including adjusted translation state usage information for one or more UE(s).

According to a second aspect of the invention there is provided a method for operating a NAT64 node in a communications network including a UE and a subscription control node, where the NAT64 node includes a UE list of translation states for the UE, each translation state for use in translating IP addresses from a first type of IP address to a second type of IP address for data packets received from the UE. The method includes the steps of receiving a data packet from the UE, the data packet having a first type of IP address, translating the IP address of the data packet to a second type of IP address, when the IP address of the data packet corresponds to a translation state in the UE list. The method further includes determining if the current number of translation states in the UE list is less than a maximum number of translation states the NAT64 node can allocate to the UE when the IP address does not correspond to a translation state in the UE list. If the current number of translation states is less than the maximum number of translation states allowable for the UE, then performing the steps of creating a new translation state corresponding to the IP address of the data packet and updating the UE list when the current number of translation states is less than the maximum number of translation states, updating the current number of translation states to include the new translation state, and transmitting an update message to the subscription control node including an indication of the current number of translation states for the UE for use in tracking the total number of translation states in use for the UE.

As an option, the step of determining may further include sending a query to the subscription control node for the maximum translation states the NAT64 node can allocate to the UE. In addition, the method may include receiving a message including subscription information of the UE, the subscription information including the maximum number of states that the NAT64 node can allocate to the UE, and storing the subscription information of the UE. As another option, the step of determining further includes retrieving the maximum number of states that the NAT64 node can allocate to the UE from the stored subscription information of the UE. The method may further include removing a translation state from the UE list when the connection established between the UE and the IP address associated with the translation state is terminated, and updating the current number of states in the UE list.

Optionally, there is provided the step of transmitting a message to the subscription control node indicating the updated current number of states in the UE list. Alternatively or additionally, there is provided sending an error message associated with the IP address of the received data packet to the UE when the maximum number of translation states that the NAT64 node can allocate to the UE has been reached in the UE list. As an option, the step of transmitting the update message may include transmitting the update message after a predetermined number of new translation states have been allocated to the UE. Additionally or alternatively, the step of transmitting the update message includes transmitting the update message periodically. As another option, there is provided the step of receiving a resource request message from the subscription control node and transmitting, to the subscription control node, a message including the current number of number of translation states.

As an option, the communications network includes a second NAT64 node, the second NAT64 node includes a second UE list of translation states for the UE, and the method may further include the steps of receiving a message including subscription information of the UE, the subscription information including a new maximum number of translation states that the NAT64 can allocate to the UE, the new maximum number of translation states having been derived from the current number of translation states of the UE list and the current number of translation states of the second UE list, and updating the maximum number of translation states of the UE list with the new maximum number of translation states.

According to a third aspect of the invention there is provided a subscription control node for use in a communications network, the communications network including multiple UEs and multiple NAT64 nodes, the subscription control node including a receiver, a transmitter, a memory unit, and a processor, the processor being connected to the receiver, to the transmitter, and to the memory unit. The memory unit includes storage for subscription information for one or more of the UEs, the subscription information for each UE including translation state usage information associated with one or more of the NAT64 nodes servicing the UE. The processor and transmitter are configured to collect translation state usage information from each NAT64 node. The processor is further configured to identify a set of one or more UE(s) exceeding a maximum translation state usage allocated to each of the multiple UEs based on the corresponding subscription information and the collected translation state usage information. The processor is also configured to adjust the translation state usage information in the subscription information of the identified set of UE(s) to meet the maximum translation state usage for each UE, and updating the corresponding subscription information. The transmitter is further configured to transmit the updated subscription information of the identified set of UE(s) to the corresponding NAT64 nodes.

As an option, the processor, receiver, and transmitter are further configured to receive a request query from a first NAT64 node of the multiple NAT64 nodes for subscription information associated with a first UE, retrieve the subscription information associated with the first UE, and transmit the subscription information associated with the first UE to the first NAT64 node, the subscription information including the maximum number of translation states that the first NAT64 node may allocate to the first UE. As another option, the communication network further comprises a DNS64 node, and the processor, transmitter and receiver are further configured to receive, from the DNS64 node, a request for a prefix address list associated with a second UE of the multiple UEs for use in resolving a first type of IP addresses with a second type of IP addresses for the second UE, to retrieve, from the subscription information for one or more of the UEs, data representative of the prefix address list associated with the second UE, and transmit the data representative of the prefix address list associated with the second UE to the DNS64 node.

According to a fourth aspect of the invention there is provided a NAT64 node in a communications network, the communication network including a UE and a subscription control node, the NAT64 node including a receiver, a transmitter, a memory unit, and processor, the processor being connected to the receiver, to the transmitter, and to the memory unit. The memory unit includes storage for a UE list of translation states for the UE, each translation state for use in translating IP addresses from a first type of IP address to a second type of IP address for data packets received from the UE. The receiver is configured for receiving a data packet from the UE, the data packet having a first type of IP address, the processor is configured for translating the IP address of the data packet to a second type of IP address, when the IP address of the data packet corresponds to a translation state in the UE list. The processor is further configured to determine if the current number of translation states in the UE list is less than a maximum number of translation states the NAT64 node can allocate to the UE when the IP address does not correspond to a translation state in the UE list. If the current number of translation states is less than the maximum number of translation states allowable for the UE, then the processor and transmitter are further configured to create a new translation state corresponding to the IP address of the data packet and update the UE list when the current number of translation states is less than the maximum number of translation states, update the current number of translation states to include the new translation state, and transmit an update message to the subscription control node including an indication of the current number of translation states for the UE for use in tracking the total number of translation states in use for the UE.

As an option, the communications network includes a second NAT64 node, the second NAT64 node includes a second UE list of translation states for the UE, the processor and receiver are further configured to receive a message including subscription information of the UE, the subscription information including a new maximum number of translation states that the NAT64 node can allocate to the UE, the new maximum number of translation states having been derived from the current number of translation states of the UE list and the current number of translation states of the second UE list, and update the maximum number of translation states of the UE list with the new maximum number of translation states.

As an option, the subscription information storage node is an SPR node and the subscription control node is a PCRF node. In addition, the first type of IP address is an IPv6 address and the second type of IP address is an IPv4 address.

Embodiments of the present invention can provide a relatively simple and efficient mechanism for providing a fair usage and amount of resources to all UEs in a communications network. This provides a way for operators to provide differentiated services for UEs and dynamically control the resource consumption inside core networks and inside different NAT64 nodes.

DETAILED DESCRIPTION

Figure 1:
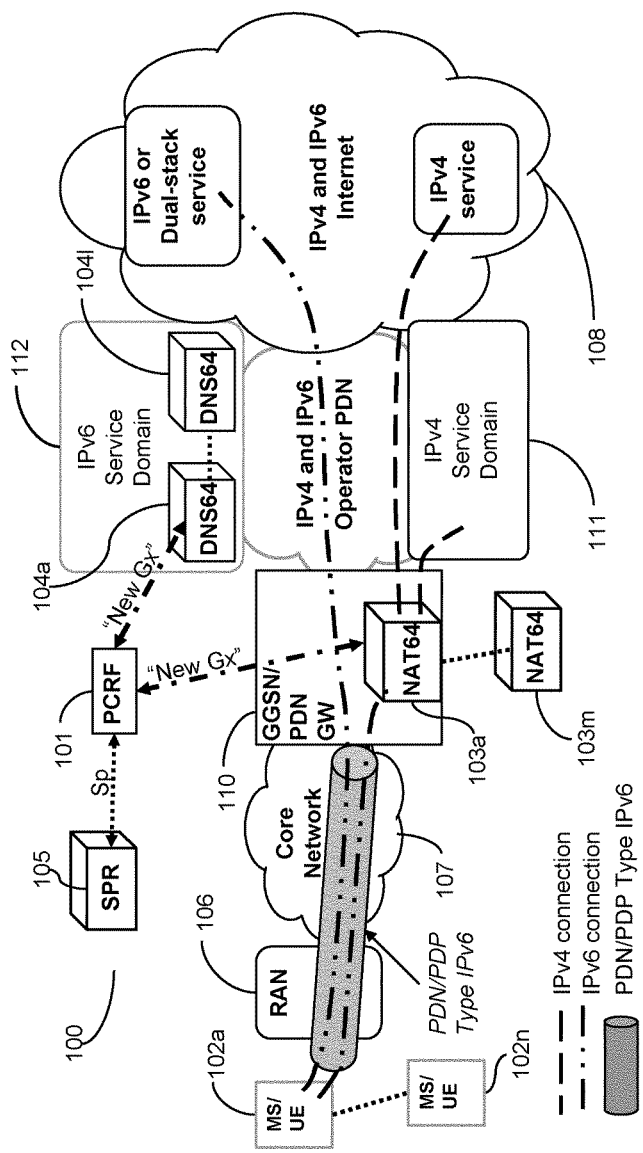
FIG. 1 illustrates schematically a communication network according to embodiments of the present invention.

In order to at least partially overcome the problems described above, it is proposed herein to improve the mechanism for providing fair usage of resources by controlling and monitoring the amount of resources UEs receive in a communication network. In particular, mechanism uses subscription information and the NAT64 and DNS64 functions by including a new reference point between the policy control and charging (PCC) architecture and the NAT64 and DNS64 nodes. This reference point can be used to download specific information for each UE from the subscription policy repository to the NAT64 and DNS64 nodes, when the specific information is needed. The reference point may be used to relay charging information to the PCC from a NAT64 node. In addition, further useful information related to the UE subscription is now available to the PCC and SPR and can be stored.

In particular, the mechanism may provide the NAT64 node with UE specific information on the number of translation states each UE is allowed to use at the same time and at any given time. This information needs to be updated because the UE traffic may be divided between more than one NAT64 node at the same time. Initially, each NAT64 node servicing a UE may request this information via the new reference point from the PCC architecture, for example from the PCRF node, when the first translation state for the UE is created. The PCRF node may communicate the maximum number of translation states that the NAT64 node may be allowed to allocate to the UE. After this the NAT64 keeps count of the number of translation states it has allocated to the UE, and to create translation states for the UE until a given limit of translation states for that NAT64 node has been reached. Upon determining when a UE has been allocated translation states by one or more NAT64 nodes, the PCRF node may include further logic to control the total number of UE translation states that can be allocated by all the NAT64 nodes. The PCRF node can actively monitor the number of translation states by requesting a translation state count per UE from each NAT64 node, and in response, it can lower and increase the translation state limits for each UE serviced by each of the NAT64 nodes based on the used amount of translation states for the UE, the network load, and the UE subscription information. In addition, each NAT64 node may be arranged to keep a log or list of translation states allocated per UE, and reports these amounts to the PCRF node for monitoring and charging purposes.

In addition to monitoring and controlling each NAT64 node in allocating translation states to each UE, the mechanism may further provide the DNS64 node with specific UE information and/or NAT64 node resource consumption information when the DNS64 node synthesizes an IPv6 address(es) upon a Uniform Resource Location (URL) resolve request from one or more UE(s). The DNS64 node can use the new reference point to download UE subscription information from the PCC architecture, e.g. the PCRF node, when it receives a DNS request from a UE for the first time. The DNS64 node can then cache the UE subscription information for the subsequent DNS requests. The UE subscription information may include a priority list of the allowed NAT64 nodes for the given UE. During peak hours the PCRF node may further relay priority levels of NAT64 nodes to the DNS64 node in order for the DNS64 node to select a pref64 for a NAT64 node that has the lowest level of resources consumed (e.g. the lowest levels of used translation states for a given UE, a set of UEs, or from all UEs). The PCC architecture may further relay information to the DNS64 node when some NAT64 nodes should not accept more connections from a given UE, a set of UEs, or from all UEs.

FIG. 1 illustrates a schematic diagram of a communication network 100 for an example NAT64 and DNS64 node deployment for use in the example solutions of monitoring and controlling communication resources usage by UEs 102a-102n. The communication network 100 further includes a radio access network (RAN) 106 providing UEs 102a-102n with access to a core network 107 (e.g. a 3GPP core network based on 3GPP TR 23.975), a PDN GW 110, and IPv4/IPv6 operator PDN, NAT64 nodes 103a-103m, DNS64 nodes 104a-104l, and IPv4 and IPv6 Internet 108 including IPv4 and IPv6 networks.

Communication network 100 further includes PCC architecture such as PCRF node 101 that is in communication with one or more of the NAT64 nodes 103a-103m some of which are deployed or co-located in PDN GW 110 and some of which may be deployed or co-located with one or more DNS64 nodes 104a-104l in IPv6 service domain 112. Enabling communication between the PCC architecture such as PCRF node 101 and NAT64 nodes 103a-103m and DNS64 nodes 104a-104l is a reference point labelled the "New Gx" reference point.

In communication network 100, some UEs 102a-102n may communicate using IPv6 addressing, so for traffic directed to/from IPv6 networks there is no need for IP address conversion. In this case, the UEs 102a-102n may directly access the IPv6 networks in the IPv4 and IPv6 Internet 108 via RAN 106, core network 107, PDN GW 110, and IPv4/IPv6 operator PDN. For traffic directed to/from IPv4 networks, UEs 102a-102n may communicate with the IPv4 networks in the IPv4 and IPv6 Internet 108 using IPv6 addressing via RAN 106, PDN-GW 110, DNS64 nodes 104a-104l and/or NAT64 nodes 103a-103m, and IPv4/IPv6 operator PDN.

The communications network 100 includes a subscription policy repository 105 that includes subscription information related to the UEs 102a-102n. This UE subscription information may include the subscription information as specified in 3GPP TS 23.203 (e.g. section 6.2.4). In communications network 100, the SPR node 105 is in communication with PCRF node 101 and so has access to further UE specific subscription information, which may be included with the UE subscription information.

UE specific subscription information may comprise or represent any UE subscription information such as subscriber information related to NAT64 and/or DNS64 nodes 103a-103m or 104a-104l for one or more UEs 102a-102n. Examples of UE specific subscription information that may be used in certain examples or embodiments of the described communication network 100 is UE information related to the allowed UE service type for the NAT64 and DNS64 services, maximum number of translation states allowed for the UE for each NAT64 node, priority list of the allowed NAT64 nodes for the UE, NAT64 charging policy information of the UE.

The PCRF node 101 is in communication with the SPR node 105 via an Sp reference point and in communication with the NAT64 nodes 103a-103m and the DNS64 nodes 104a-104l by the "new Gx" reference point. This means the UE subscription information stored at SPR node 105 may be communicated with PCRF node 101 and NAT64 nodes 103a-103m and DNS64 nodes 104a-104l. In addition, the UE subscription information may further include UE specific subscription information related to the NAT64 nodes 103a-103m and DNS nodes 104a-104l. PCRF node 101 can be configured to query SPR node 105 for UE subscription information including UE specific subscription information for use in controlling and updating the NAT64 nodes 103a-103m and/or DNS64 nodes 104a-104l. The PCRF node 101 may further update the UE specific subscription information and further update the SPR node 105 with UE specific information updates generated by NAT64 nodes 103a-103m and/or DNS64 nodes 104a-104l or even the PCRF node 101.

The SPR node 105 notifies the PCRF node 101 when the UE subscription information (and UE specific subscription information) changes for particular UEs. This may be due to the operator updating the subscription information of a UE due to changes to a service plan for a user of a UE. In addition, the NAT64 charging information can be gathered from the NAT64 nodes 103a-103m following the charging policies in SPR node 105 and then sent to the Online Charging System (OCS) by the PCRF node 101 in a format specified for the Sy reference point.

In the PCC architecture, the PCRF node 101 uses a Gx reference point to communicate with a PCEF node (not shown) and via the Gx reference point the PCRF node 101 has dynamic control over the PCC functionality in the PCEF node. The Gx reference point enables PCEF node to request policy decisions from PCRF node 101, and enables the PCRF node 101 to deliver IP-CAN specific parameters and policy decisions to PCEF node, etc. The "New Gx" reference point between the NAT64 nodes 103a-103m and DNS64 nodes 104a-104l to the PCRF node 101 allows the PCRF node 101 to monitor and control the NAT64 and DNS64 communication resources used by UEs.

The "New Gx" reference point may be implemented by extending or using a subset of the existing Gx reference point architecture. The existing Gx reference point is located between the PCRF node and the PCEF nodes and can be used for charging control, policy control or both, which includes sharing UE subscription information. In addition to some of the functionality of the existing Gx reference point, the "New Gx" reference point may comprise or represent a reference point that allows the NAT64 nodes 103a-103m, DNS64 nodes 104a-104l, and PCRF node 101 to communicate with each other for use in monitoring and controlling the NAT64 and DNS64 communication resource usage of UEs. Examples of communication over the "New Gx" reference point that may be used in certain examples or embodiments of the described communications networks may further allow a) NAT64 nodes 103a-103m to request UE maximum translation state value from PCRF node 101; b) the PCRF node 101 to update the maximum state values for UEs in corresponding NAT64 nodes 103a-103m; c) the NAT64 nodes 103a-103m to inform PCRF node 101 about resource usage of UEs serviced by the NAT64 nodes 103a-103m; d) the DNS64 nodes 104a-104l to request pref64s allowed for a UE, and e) the PCRF node 101 to update priority order of UE pref64s in DNS64 nodes 104a-104l.

An example solution is now described for the mechanism for providing a fair usage and amount of resources to all UEs 102a-102n in communications network. 100. In particular, the mechanism allowing the PCC architecture, e.g. the PCRF node 101, to interact with one or more NAT64 nodes 103a-103m and one or more DNS64 nodes 104a-104l that may be servicing the UEs 102a-102n. This provides a way for operators to provide differentiated services for UEs and dynamically control the resource consumption inside core networks and inside different NAT64 and DNS64 nodes 103a-103m and 104a-104l.

Figure 2A:
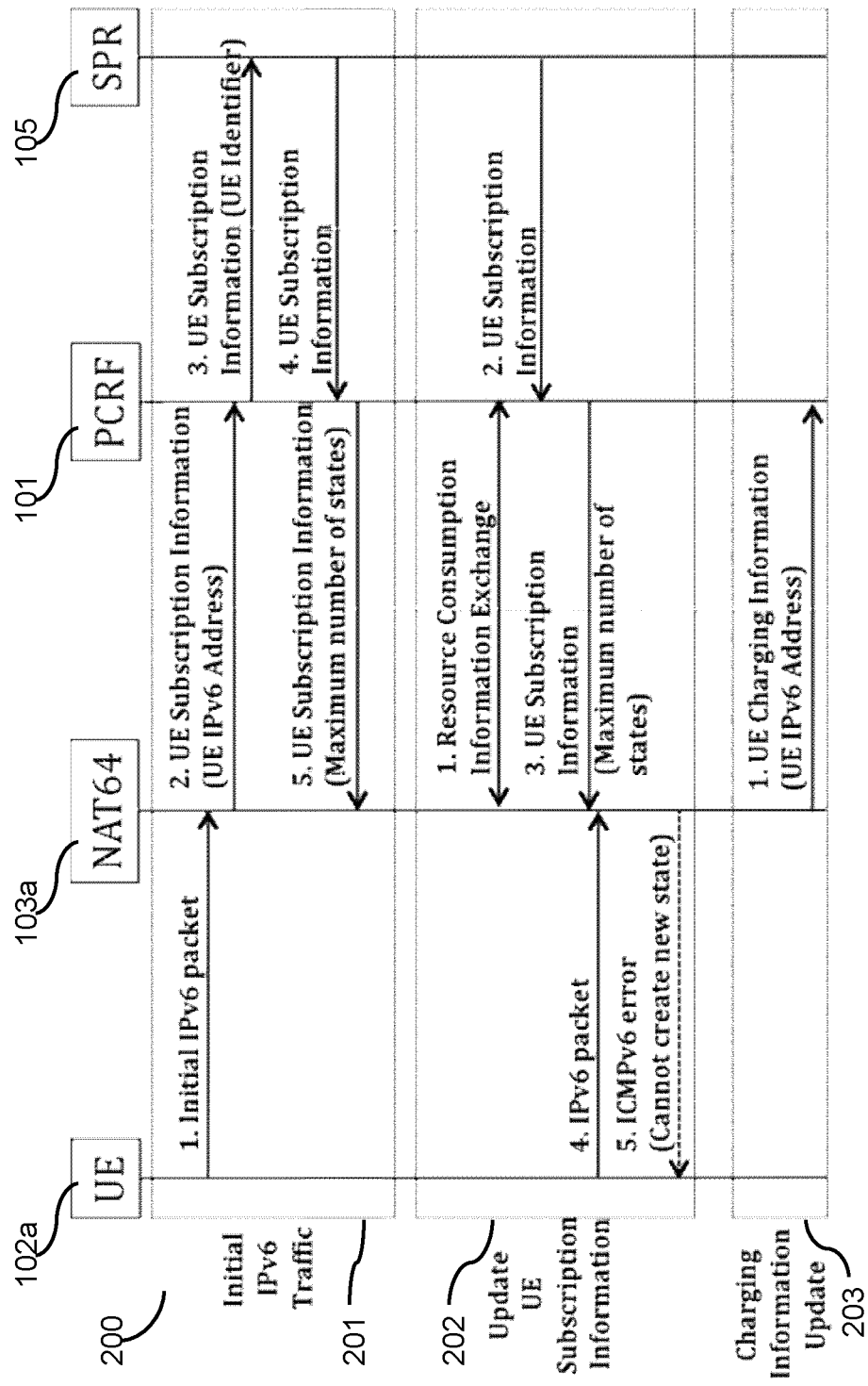
FIG. 2a illustrates schematically a signal flow diagram of an example solution according to the present invention.
Figure 2B:
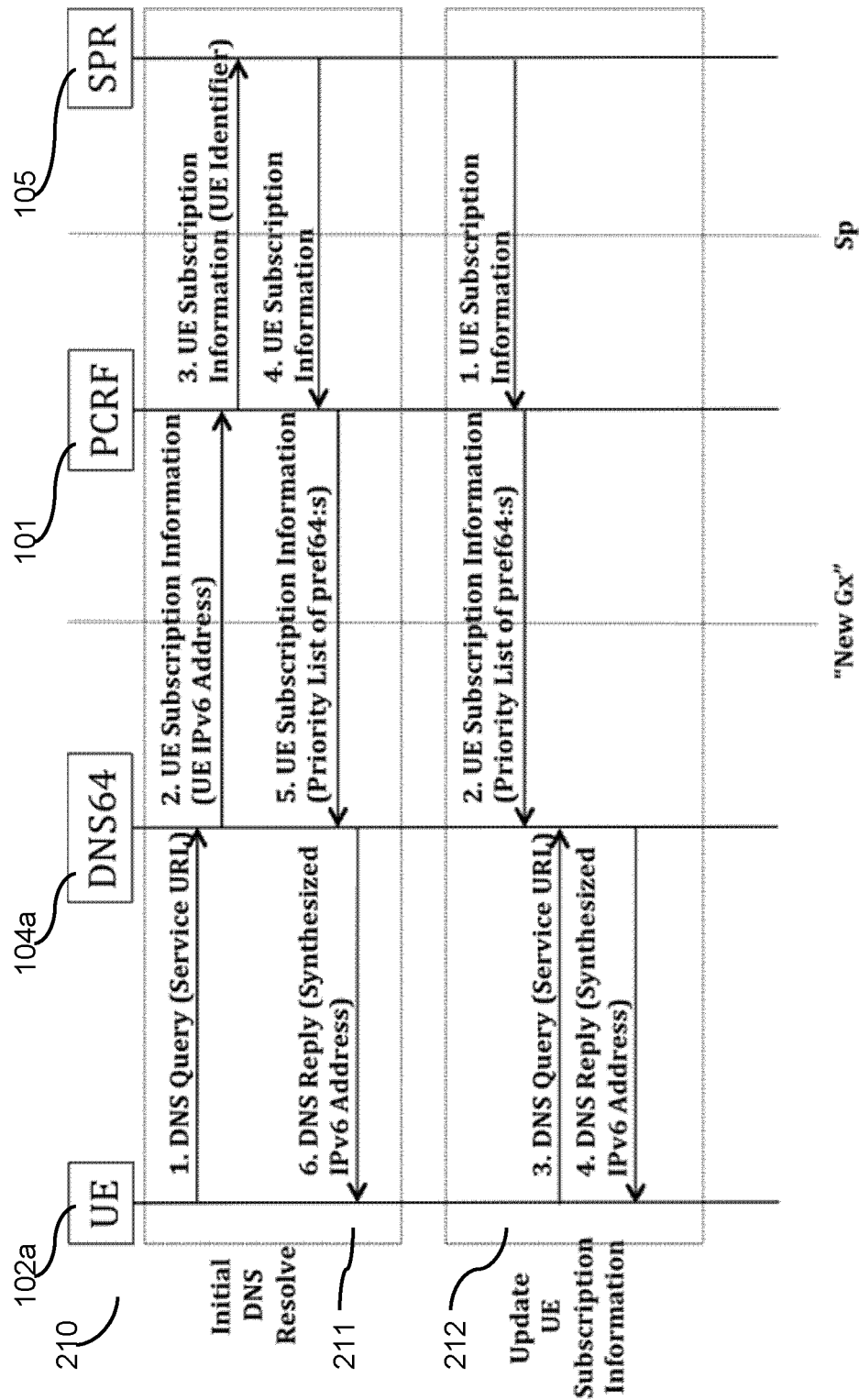
FIG. 2b illustrates schematically a signal flow diagram of another example solution according to the present invention.

FIGS. 2a and 2b illustrate signalling flow diagrams of example solutions for providing fair usage of communication resources for UEs 102a-102n in communications network 100, In particular, FIG. 2a illustrates a signalling flow diagram of a process 200 for an example solution for operating a subscription control node (e.g. a PCRF node 101), a subscription storage node (e.g. a SPR 105 node) and a NAT64 node 103a, FIG. 2b illustrates a signalling flow diagram of an example solution for operating a subscription control node (e.g. PCRF 101), a subscription storage node (e.g. SPR 105) and a DNS64 node 104a. In the following description, the references used in FIG. 1 will be reused for like or similar network components.

Referring to FIG. 2a, the process 200 illustrates the PCC architecture and NAT64 interaction for providing fair usage of NAT64 communication resources of a NAT64 node 103a servicing a UE 102a. As illustrated there are several processes showing the PCC architecture (PCRF node 101 and SPR 105) interacting with a NAT64 node 103a. These processes include: 1) "Initial IPv6 Traffic" scenario 201 where a UE 103a is using services of a NAT64 node 103a for the first time, 2) "Update UE Subscription Information" scenario 202, which allows dynamic update of maximum translation state amounts and limits, and 3) "Charging Information Update" process 203 for letting the NAT64 node 103a know how much UE traffic it has been handling.

It is assumed that UE 102a has already communicated with a DNS64 node (not shown) and has an IPv6 address synthesized by the DNS64 node. In step 1 of the "Initial IPv6 Traffic" process 201, UE 102a initiates a NAT64 translation by sending a first IPv6 packet to the IPv6 address synthesized by the DNS64 node. It is assumed that the UE. The first IPv6 packet may be, for example, the first TCP SYN segment. When receiving this message the NAT64 node 103a determines from its internal cache/database whether it already has the NAT64 UE specific subscription information for UE 103a related to the maximum translation state value (MTSV) or limit for the UE 103a. The NAT4 node 103a may identify UE 102a by the IPv6 source address in the received IPv6 packet header. If the MTSV for UE 102a is known to NAT64 node 103a and UE 102a has not exceeded the MTSV or the maximum allowed number of translation states that the NAT64 node 103a may use, then the NAT64 node 103a may create or add a new translation state to the list of translation states for UE 102a and begin translating the traffic related for this state. Otherwise the process 201 proceeds to step 2.

In step 2, if the NAT64 node 103a doesn't have the NAT64 UE specific subscription information, then it sends a message to the PCRF node 101 requesting the related UE specific subscription information for UE 102a. In this example, the NAT64 node 103a uses the "New Gx" reference point interface between NAT64 node 103a and PCRF node 101. The request message will include the IPv6 source address of UE 103a so that PCRF node 101 may identify UE 103a.

On receiving the request message from the NAT64 node 103a in relation to UE 102a, the PCRF node 101 locates the UE identifier using the received IPv6 address of UE 102a and uses this UE identifier to search for the NAT64 UE specific subscription information for UE 102a. If the UE specific subscription information for UE 102a is located locally, then the process 201 proceeds to step 5 where the PCRF node 101 sends the UE specific subscription information for UE 103a back to the NAT64 node 103a. However, if the UE specific subscription information for UE 103a is not located with the PCRF node 101, then the PCRF node 101 requests this information from SPR node 105 in step 3.

In step 3, the PCRF node 101 sends a request message to SPR node 105, which may be via the updated Sp reference point. The request message includes data representative of the UE identifier for UE 102a that is used to identify UEs within the PCC architecture. On receiving the request message from the PCRF node 101, the SPR node 105 locates the NAT64 UE specific subscription information (e.g. the maximum number of allowed translation states for UE 102a, NAT64 service charging policies for UE 102a, etc.) for the UE 102a from a database or storage accessible to the SPR 105. In step 4, the requested NAT64 UE specific subscription information is sent back to the PCRF node 101 through the "New Gx" reference point. On receiving the NAT64 UE specific subscription information for UE 103a from SPR node 105, the PCRF node 101 will update its local database or storage and stores the NAT64 policy information of the UE 102a locally.

In step 5, the PCRF node 101 provisions the NAT64 node 103a with the UE specific subscription information of UE 102a via the "New Gx" reference point. Once the NAT64 node 103a has the UE specific subscription information of UE 102a, then the NAT64 node 103a can handle subsequent translation state creations and rejections in relation to UE 102a based on the received UE specific subscription information. In addition, the NAT64 node 103a can follow the charging policy rules set by the PCC architecture.

To dynamically update the NAT64 UE specific subscription information for UEs that are being serviced by the NAT64 node 103a the PCC can use the "Update UE Subscription Information" messaging process 202 illustrated in FIG. 2a. In step 1 a resource consumption information exchange between the NAT64 nodes 103a-103m and the PCC architecture, in this example the PCRF node 101, is performed. The NAT 64 nodes 103a-103m are configured to report resource usage of UEs 102a-102n being serviced by the NAT64 nodes 103a-103m to the PCRF node 101. This allows the PCRF node 101 to analyse the resource usage and control the NAT64 services provided to UEs 102a-102n in a fair manner and which also follows the subscribed services for the UEs 102a-102n. This resource consumption information exchange is performed by the NAT64 nodes 103a-103m reporting their resource usage or consumption periodically, and/or by having the PCRF node 101 request the resource consumption information (also known as resource usage information), which may occur when management cycles are run in the PCRF node 101. It is to be appreciated that a combination of these reporting methods may be used.

Once the PCRF node 101 has the resource consumption information from each NAT64 node 103a-103m it can use internal logic/algorithms to determine if some UEs 102a-102n are found to be using too much NAT64 resources. That is, a set of one or more UEs 102a-102n are found by the PCRF node 101 to be using more translation states than have been allocated to them by their subscription, or using more translation states than have been allocated to the corresponding NAT64 node 103a-103m by the PCRF node 101. As multiple NAT64 nodes 103a-103m can serve a UE 103a, the PCRF node 101 can limit the number of translation states each NAT64 node 103a-103m can allocate to the UE 102a for balancing the NAT64 resource usage in the communication network 100.

In performing the analysis and control, the PCRF node 101 can initiate a UE specific subscription information update when a set of UEs from UEs 102a-102n in communication network 100 are using excessive NAT64 resources. If necessary, for example, the PCRF node 101 can issue control messages to "demand" a particular NAT64 node 103a should not accept anymore UE translation states in relation to one or more UEs 102a-102n, or issue control messages to indicate that some other NAT64 nodes 103b-103m should allow the subsequent UE translation states in relation to the one or more UEs 102a-102n.

In step 2 of the "Update UE Subscription Information" messaging process 202, with reference to UE 102a and NAT64 node 103a, if the UE specific subscription information for UE 102a is updated inside the SPR node 105 then the updated UE subscription information is notified to the PCRF node 101 so that the update can take effect for the services provided to UE 102a. The SPR node 105 sends an update message to the PCRF node 101, the update message including UE subscriber information, which may include UE specific subscriber information in relation to UE 103a. On receiving the updated UE subscriber information for UE 102a, the PCRF node 101 updates its UE subscriber information for UE 102a and then calculates based on the internal logic the new resource usage or consumption information that may be needed for use in each NAT64 node 103a-103m. The new resource usage or consumption information may include a new limit for the maximum number of translation states, and for each NAT64 node 103a-103m serving UE 102a it may also include the maximum number of translation states that a NAT64 node 103a may use in relation to UE 102a. This information is included into the UE specific subscription information for UE 103a and sent to the corresponding NAT64 nodes 103a-103m that serve UE 102a.

The PCRF node 101 then sends, in step 3, update message(s) in relation to the UE specific subscription information for UE 102a to the NAT64 nodes 103a-103m serving UE 102a. The PCRF node 101 can send the updated subscription information to the NAT64 nodes 103a-103m serving UE 102a through the "New Gx" reference point. The PCRF node 101 uses the IPv6 address of UE 102a to specify to the NAT64 nodes 103a-103m the UE specific subscription information that is needed to be updated.

In step 4, after an update as described in step 3, subsequent IPv6 packets sent by UE 102a to an updated NAT64 node, e.g. NAT64 node 103a, that would result in the creation of a new translation state for UE 102a are handled based on the updated UE specific subscription information the NAT64 node 103a received from PCRF node 101. In step 5, if the NAT64 node 103a determines that UE 102a has exceeded the maximum number of states allowed or the maximum number of states that NAT64 node 103a is allowed to create for UE 102a, then the state creation will be rejected and an ICMPv6 error message indicating this can be sent from the NAT64 node 103a to the UE 102a.

It is to be appreciated that the messaging over the "New Gx" reference point is also used for sending charging information for UEs 102a-102n from the NAT64 nodes 103a-103m serving the UEs to the PCC architecture if required by the operator. In particular, "Charging Information Update" process 203 can be performed by the NAT64 nodes 103a-103m. In this example, NAT64 node 103a is configured to periodically send data representative of charging information based on the UE subscription charging policies set by the operator. This information may be sent over the "New Gx" reference point to the PCRF node 101, where the PCRF node 101 forwards to the OCS function inside the PCC architecture by using a Sy reference point. Alternatively or additionally, the NAT64 node 103a can be further configured to receive charging information request messages from PCRF node 101. The PCRF node 101 may send requests for charging information to NAT64 nodes 103a-103m in relation to a particular UE, e.g. UE 102a, or to set or lists of UEs 102a-102n based on the operator's preferences.

FIG. 2b illustrates a signalling flow diagram of an example solution for operating a subscription control node (e.g. PCRF 101), a subscription storage node (e.g. SPR 105) and a DNS64 node 104. FIG. 2b illustrates a DNS64 and PCC interaction process 210 for providing fair usage of communication resources in relation to UE 102a. In particular, process 210 may include a "Initial DNS Resolve" process 211 and a "Update UE Subscription Information" process 212. The "Initial DNS Resolve" process 211 relates to when the DNS64 node 104 receives a DNS query from a UE 102a in which DNS64 node 104 has not yet cached the information for UE 102a. The "Update UE Subscription Information" process 212 relates to when the UE subscription information for UE 102a is updated in the SPR node 105, such that the DNS64 node 104 should be updated. The updated UE subscription information, which may include specific UE subscription information, is sent to the DNS64 node 104 via the PCRF node 101.

Referring to "Initial DNS Resolve" process 211, in step 1, UE 102a sends a AAAA (so-called quad-A) DNS request for a service. The DNS64 node 104 searches for the pref64 list of UE 102a in its internal policy database/cache. If the entry for the pref64 list of UE 102a is found, then the DNS64 node 104 proceeds to step 6 where it synthesizes the IPv6 address for the service and replies to the DNS request. Otherwise, the process 211 proceeds to step 2, when it is determined whether the UE subscription information is available to the DNS64 node 104. In step 2, if the UE subscription information is not present in the DNS64 node 104, the DNS64 node 104 transmits to the PCRF node 101 a "UE Subscription Information" request message for the UE subscription information, which may include the UE specific subscription information. This may be sent via the "New Gx" reference point. The DNS64 node 104 includes in the "UE Subscription Information" request message the source IPv6 address of UE 102a as a key to allow the PCRF node 101 to identify UE 102a.

When the PCRF node 101 receives the "UE Subscription Information" request message from the DNS64 node 104, it will use the IPv6 address of the UE 102a to search through its locally stored UE subscriber information to locate the UE identifier used internally in the PCC architecture for locating UE subscription information. The PCRF node 101 may or may not have locally stored the DNS64 specific information for the UE when creating the IP-CAN bearer. However, if the DNS64 specific information is available to the PCRF node 101, then the PCRF node 101 performs step 5 in which the DNS64 specific information including the priority list of pref64s for UE 102a is sent to the DNS64 node 104. If the PCRF node 101 does not have the required DNS64 information such as the pref64 information of UE 102a, then in step 3, the PCRF node 101 sends a "UE Subscription Information" request message requesting this information from the SPR node 105, the "UE Subscription Information" request message includes the UE identifier for UE 102a. In sending the "UE Subscription Information" request message for DNS64 UE specific subscription information of UE 102a, the PCRF node 101 may use the updated Sp reference point.

On receiving the "UE Subscription Information" request message for the DNS64 UE specific information for UE 102a from the PCRF node 101, the SPR node 105 locates the required information, e.g. the priority list of pref64 for UE 102a, and in step 4, the SPR node 105 transmits a "UE Subscription Information" response message to the PCRF node 101, the "UE Subscription Information" response message includes the priority list of pref64 for the UE 102a identified by the UE identifier. On receiving the "UE Subscription Information" response message from SPR node 105, the PCRF node 101 updates its local storage/database to include the priority list of pref64 for UE 102a. In step 5, the PCRF node sends a "UE Subscription Information" response to the DNS64 node with the DNS64 UE specific information including the priority list of pref64s for UE 102a. This may be performed using the "New Gx" reference point.

On receiving the DNS64 UE specific information, the DNS64 node 104 can resolve the IPv4 and IPv6 addresses for the services UE 102a requested before or after acquiring the pref64 information for the UE 102a. The DNS64 node 104 caches the requested DNS64 UE specific information of UE 102a from PCRF node 101, then if necessary, the DNS64 node 104 uses the highest priority pref64 to synthesize an IPv6 destination address for the service requested by UE 102a. In step 6, this IPv6 address is then returned to the UE 102a in a DNS Reply message including the synthesized IPv6 Address.

When UE information is updated in the SPR node 105 or the resource situation in the NAT64 nodes 103a-103m changes, the PCRF node 101 performs the "Update UE Subscription Information" process 212. The initial update event to update the priority list of pref64 may come from the SPR node 105 when the UE subscription information for a UE, such as UE 102a, is changed or when the PCRF node 101 determines that one or more NAT64 nodes 103a-103m are fully used. That is based on network loading of the NAT64 nodes 103a-103m.

In step 1, it has been assumed that the UE subscription information for UE 102a at the SPR node 105 has been updated, therefore, the update event is initiated through the Sp reference point by the SPR node 105 by sending a Notification message with the updated pref64 list to the PCRF node 101. The Notification message includes the updated UE subscription information for UE 102a. It is to be appreciated that the PCRF node 101 can also initiate the update procedure based on internal logic/algorithms. On receiving the Notification message including the updated pref64 list for UE 102a, in step 2, the PCRF node 101 sends the updated priority ordered list of pref64s to the DNS64 node 104 in the "UE Subscription Information" message, which includes the priority list of pref64:s. The "New Gx" reference point may be used. On receiving the DNS64 will update the locally stored pref64 list for UE 102a so the subsequent DNS request from the "UE Subscription Information" message, the UE 102a will be handled based on the updated priority list.

In step 3, the UE 102a may resolve a new URL by sending the DNS64 node 104 a SNR Query message including the URL of the requested service, in step 4, the DNS64 node 104 selects the pref64 for the synthesized address from the updated pref64 list of UE 102a.

It is to be appreciated that although the DNS64 UE specific subscription information includes a priority list of pref64s for a UE, the messaging described in the above update may further include policies for pref64 usage for specific services. In this way, the DNS64 nodes can be controlled to synthesize IPv6 addresses for handling communication with the appropriate NAT64 node. For example, an operator may have a policy of dedicating a first NAT64 node for video streaming services and a second NAT64 node for website traffic. The DNS64 nodes may be updated based on processes 211 and 212 to include this policy information in relation to the pref64 usage. The DNS64 nodes can then be configured to synthesize IPv6 addresses directed to the first NAT64 node for video streaming services and synthesize IPb6 addresses directed to the second NAT64 node.

Figure 3A:
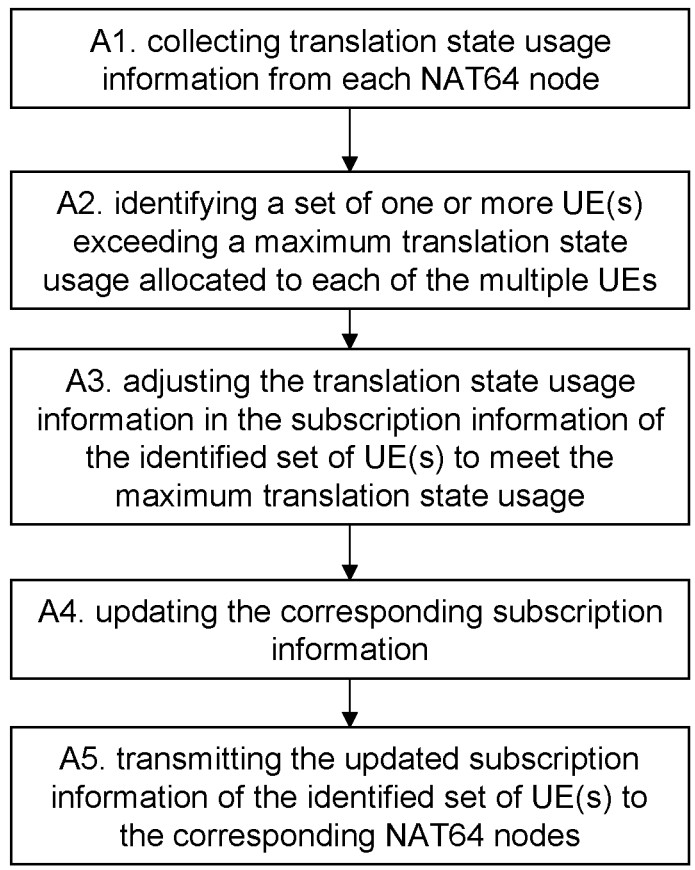
FIG. 3a illustrates schematically a flow diagram of an example process for use by a subscription control node according to embodiments of the present invention.

FIG. 3a illustrates schematically a flow diagram of another example solution for operating a policy or subscription control node (e.g. a PCRF node 101) in communication network (e.g. communications network 100). It is assumed that the communications network includes multiple UEs and multiple NAT64 nodes. The subscription control node also includes subscription information for one or more of the UEs, in which the subscription information for each UE includes translation state usage information associated with one or more of the NAT64 nodes servicing the UE. The steps performed by the subscription control node include:

A1. Collecting translation state usage information from NAT64 nodes in the communication network. This may include receiving periodic translation usage information from each NAT64 node, or a set of NAT64 nodes in the communication network, or this may include sending requests for translation state usage information from some of the NAT64 nodes in the communication network and receiving responses from the corresponding NAT64 nodes. The translation state usage information from the NAT64 nodes is processed and stored by the subscription control node. The translation usage information for a NAT64 node may include the current number of translation states allocated to a UE or to each UE that is being served by the NAT64 node or the maximum number of translation states for each UE served by the NAT64 node. Other translation state usage information may include the number of unallocated translation states for each UE or the total number of unallocated translation stated in the NAT64 node.

A2. The subscription control node may process the collected translation usage information to identify a set of one or more UE(s) exceeding a maximum translation state usage allocated to each of the multiple UEs based on the corresponding subscription information and the collected translation state usage information.

A3. On identifying the set of one or more UEs exceeding the maximum translation state usage, the subscription control node may adjust the translation state usage information stored in the subscription information for each UE of the identified set of UE(s) such that each UE will meet their maximum translation state usage.

A4. The subscription information for each UE stored by the subscription control node is updated based on the adjusted translation state information for each of the identified UEs.

A5. The subscription control node transmits the updated subscription information of the identified set of UE(s) to the corresponding NAT64 nodes.

In addition, the updated subscription information associated with the first UE may be transmitted from the subscription control node to a subscription information storage node (e.g. SPR 105). The updated subscription information may include adjusted translation state usage information for one or more UE(s).

Figure 3B:
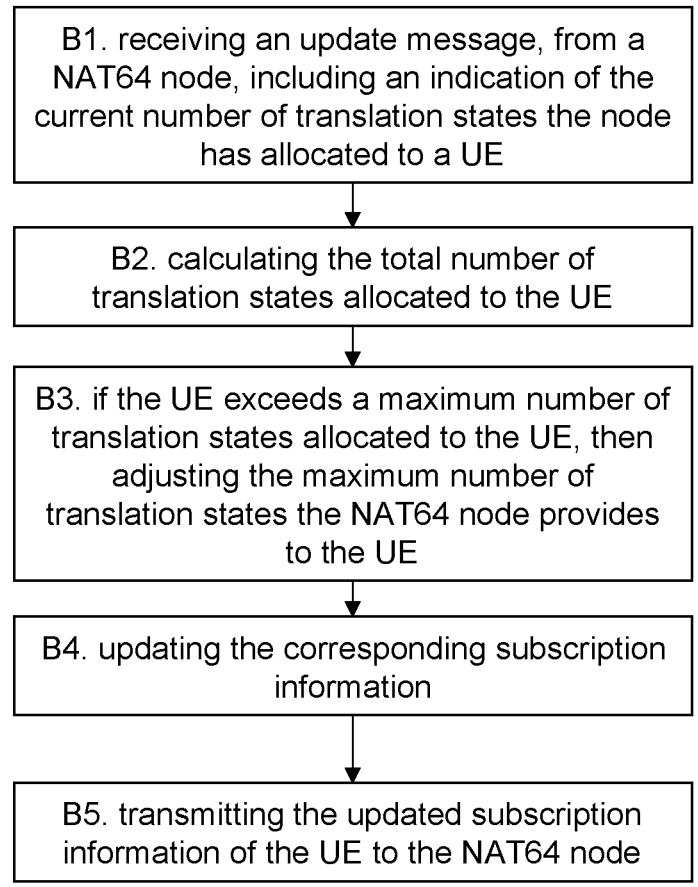
FIG. 3b illustrates schematically another flow diagram of an example process for use by a subscription control node according to embodiments of the present invention.

FIG. 3b illustrates schematically another flow diagram of an example solution for process for operating the subscription control node in the communication network. The same assumptions are considered as for the example solution in FIG. 3a. The steps performed by the subscription control node, for each UE of the multiple UEs, may include:

B1. Collecting translation usage information at the subscription control node by receiving an update message from a first NAT64 node of the multiple NAT64 nodes, the update message including an indication of the current number of translation states that the first NAT64 node has allocated to a first UE of the multiple UEs.

B2. Calculating the total number of translation states allocated to the first UE. This may include making queries to other NAT64 nodes for translation state usage information associated with the first UE, or receiving from other NAT64 nodes translation state usage information associated with the first UE. Determining whether the first UE exceeds a maximum number of translation states allocated to the first UE and proceeding to step B3.

B3. If the first UE exceeds a maximum number of translation states allocated to the first UE, then adjusting the maximum number of translation states that the first NAT64 node can allocate to the first UE, proceed to B4. Alternatively or additionally, this may include adjusting the maximum number of translation states that another NAT64 node can allocate to the first UE, proceed to B4. If the first UE does not exceed the maximum number of translation stated then proceed to B1 to collect further translation state usage information in relation to the first UE from the first or other NAT64 nodes.

Alternatively or additionally, step B3 may include identifying a set of UEs including the first UE should it be determined that the UEs in the set of UEs exceed the maximum number of translation states that each NAT64 node may allocate, then further adjusting the maximum number of translation states for each UE in the set of UE(s) that the corresponding NAT64 nodes can allocate for said each UE.

B4. Updating the subscription information associated with the first UE based on the adjusted maximum number of translation states.

B5. Transmitting the updated subscription information associated with the first UE to the first NAT64 node. Alternatively or additionally, transmitting the updated subscription information to other NAT64 nodes serving the first UE.

In addition, the updated subscription information associated with the first UE may be transmitted from the subscription control node to a subscription information storage node (e.g. SPR 105). The updated subscription information may include adjusted translation state usage information for one or more UE(s).

Figure 3C:
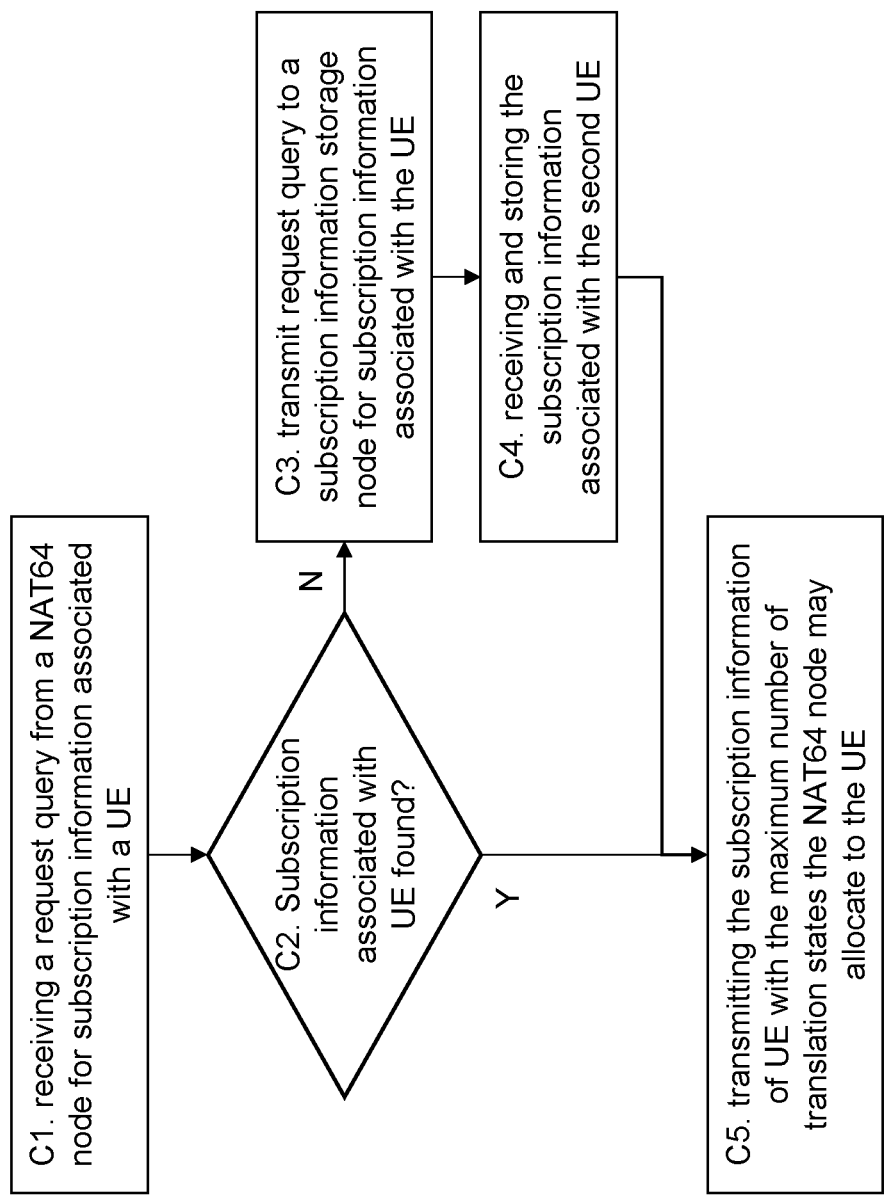
FIG. 3c illustrates schematically a further flow diagram of an example process for use by a subscription control node according to embodiments of the present invention.

FIG. 3c illustrates schematically a further flow diagram of an example solution for use by the subscription control node (e.g. PCRF node 101) when interacting with a first NAT64 node. The subscription control node may perform a process based on the following steps:

C1. Receiving, at the subscription control node, a request query from a first NAT64 node of the multiple NAT64 nodes for subscription information associated with a first UE of the multiple UEs. The subscription information may include NAT64 UE specific subscription information associated with the first UE. This may include the maximum number of translation states associated with the first UE, or the maximum number of translation states that the first NAT64 node may allocate to the first UE.

C2. Determining whether the subscription information associated with the first UE is stored or found at the subscription control node. If the subscription information is located at the subscription control node then the process proceeds to step C5. If the subscription information is not stored or found at the subscription control node then the process proceeds to step C3.

C3. Transmitting, from the subscription control node, a request query to a subscription storage node (e.g. an SPR node 105) for subscription information associated with the first UE. The request query may include data representative of a UE identifier and the requested subscription information. The requested subscription information may be NAT64 UE specific subscription information.

C4. Receiving, at the subscription control node, a notification message from the subscription storage node, the notification message including the requested subscription information associated with the first UE. This requested information may be stored or used to update the subscription information associated with the first UE at the subscription control node.

C5. Transmitting from the subscription control node the requested subscription information to the first NAT64 node, the subscription information including the maximum number of translation states that the first NAT64 node may allocate to the first UE.

Figure 3D:
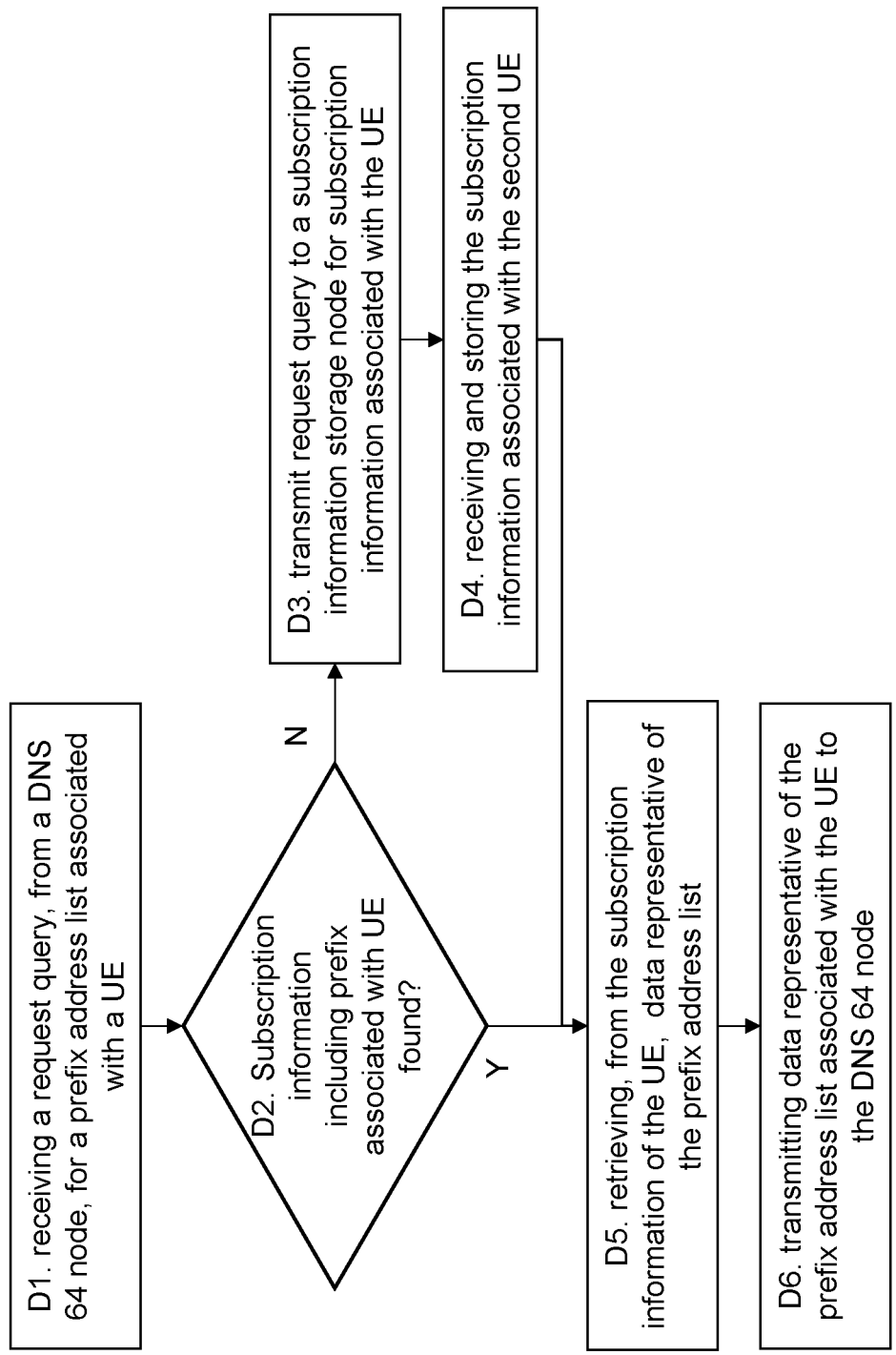
FIG. 3d illustrates schematically yet another flow diagram of an example process for use by a subscription control node according to embodiments of the present invention.

FIG. 3d illustrates schematically yet another flow diagram of an example solution of a process for use by the subscription control node (e.g. PCRF node 101) when interacting with a first DNS64 node. The subscription control node may perform a process based on the following steps:

D1. Receiving, at the subscription control node, a request query from a first DNS64 node, the request query including a request for DNS64 UE subscription information associated with a first UE of the multiple UEs for use in resolving a first type of IP address with a second type of IP address used in services requested by the first UE. The DNS64 UE subscription information including DNS64 UE specific subscription information such as a prefix address list associated with the first UE.

D2. Determining whether the DNS64 UE subscription information associated with the first UE is stored or found at the subscription control node. The subscription information including the prefix address list associated with the first UE. If the requested subscription information is located at the subscription control node then the process proceeds to step D5. If the requested subscription information is not stored or found at the subscription control node then the process proceeds to step D3.

D3. Transmitting, from the subscription control node, a request query to a subscription storage node (e.g. an SPR node 105) for the requested subscription information associated with the first UE. The request query may include data representative of a UE identifier and the requested subscription information. The requested subscription information may be DNS64 UE specific subscription information including a prefix address list associated with the UE.

D4. Receiving, at the subscription control node, a notification message from the subscription storage node, the notification message including the requested subscription information associated with the first UE. This requested information may be stored or used to update the subscription information associated with the first UE at the subscription control node. The received subscription information may be bundled with subscription information associated with one or more of the multiple UEs including the first UE.

D5. Retrieving, from the requested subscription information for one or more of the UEs and/or for the first UE, data representative of the prefix address list associated with the first UE.

D6. Transmitting, from the subscription control node, the requested subscription information to the first DNS64 node, the subscription information including data representative of the prefix address list associated with the first UE.

Figure 4A:
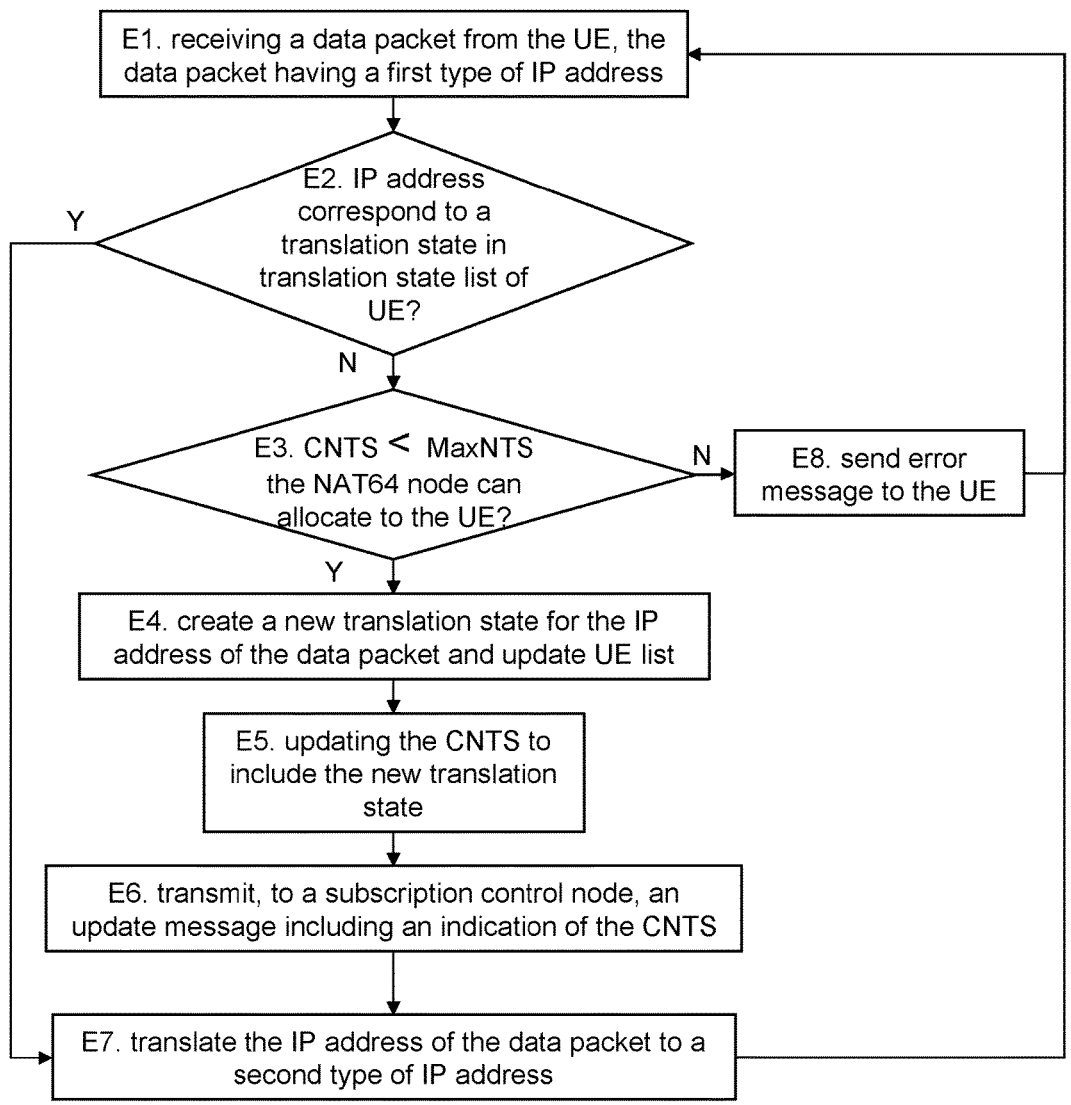
FIG. 4a illustrates schematically a flow diagram of an example process for use by a NAT64 node according to embodiments of the present invention.

FIG. 4a illustrates schematically a flow diagram of an example solution of a process for use by a NAT64 node when interacting with the PCC architecture such as a policy or subscription control node (e.g. PCRF node 101). The process for operating the NAT64 node in the communications network (e.g. communication network 100) including a first UE. The NAT64 node includes a UE list of translation states for the first UE, each translation state for use in translating IP addresses from a first type of IP address to a second type of IP address (e.g. from IPv6 to IPv4) for data packets received from or transmitted to the first UE. The steps performed by the NAT64 node, for each UE of the multiple UEs, may include:

E1. Receiving, at the NAT64 node, a data packet from a first UE, the data packet having a first type of IP address (e.g. an IPv6 address).

E2. Determining whether the first type of IP address corresponds to a translation state in the translation state list for the first UE. Proceeding to step E7 when the IP address of the data packet corresponds to a translation state in the translation state list of the first UE. Proceeding to step E3 when the IP address of the data packet does not corresponds to a translation state in the translation state list of the first UE.

E3. Determining if the current number of translation states (CNTS) in the translation state list of the first UE (e.g. UE list) is less than a maximum number of translation states (MaxNTS) the NAT64 node can allocate to the first UE. Proceeding to step E4 when the CNTS is less than MaxNTS. Proceeding to step E8 when the CNTS is not less than MaxNTS.

E4. Creating a new translation state corresponding to the IP address of the data packet and updating the translation state list for the first UE.

E5. Updating the CNTS to include the new translation state. This may be implemented by incrementing the CNTS.

E6. Transmitting, from the NAT64 node, an update message to the subscription control node including an indication of the CNTS for the first UE for use in tracking the total number of translation states in use for the first UE. Additionally or alternatively, transmitting the update message may occur after a predetermined number of new translation states have been allocated to the first UE. Additionally or alternatively, transmitting the update message occurs periodically. Additionally or alternatively, transmitting the update message occurs in response to receiving an update query from the subscription control node. The update query from the subscription control node may be sent periodically or when the subscription control node requires an update of the translation states used by each UE, or the number of unallocated translation states, in the NAT64 node.

E7. Translating the IP address of the data packet to a second type of IP address. Proceed to step E1 for receiving further data packets from the first UE and also other UEs.

E8. Transmitting, from the NAT64 node, an error message associated with the IP address of the received data packet to the first UE when MaxNTS that the NAT64 node can allocate to the first UE has been reached in the translation state list of the first UE. Proceed to step E1 for receiving further data packets from the first UE and other UEs.

When the connection established between the first UE and the IP address associated with a translation state in the translation state list for the first UE is terminated, then the translation state is removed from the UE list. The CNTS for the first UE is also updated. This may be implemented by decrementing the CNTS for the first UE.

Figure 4B:
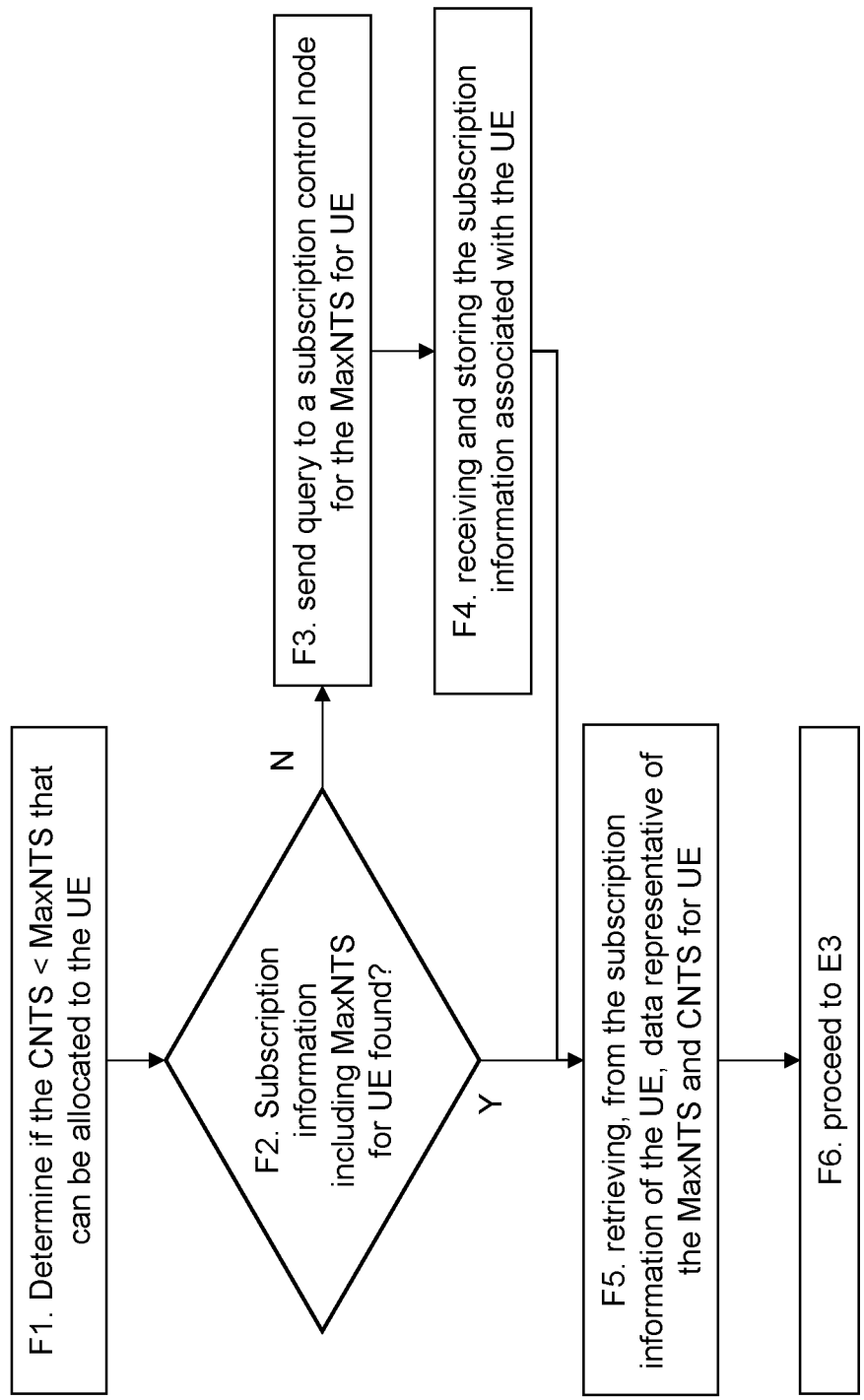
FIG. 4b illustrates schematically another flow diagram of an example process for use by a NAT64 node according to embodiments of the present invention.

FIG. 4b illustrates schematically another flow diagram associated with step E2 for use by the NAT64 node for determining whether CNTS<MaxNTS. The steps performed by the NAT64 node, for each UE of the multiple UEs, may include:

F1. Determining whether the first type of IP address corresponds to a translation state in the translation state list for the first UE. Proceeding to step F2 for locating the subscription information associated with the first UE.

F2. Determining if the NAT64 node has the subscription information associated with the first UE for use in retrieving the data representative of the MaxNTS and CNTS for the first UE. If the subscription information cannot be found or is not stored by the NAT64 node, then proceed to step F3. Otherwise, proceed to step F5.

F3. Sending a request query to the subscription control node for subscription information associated with the first UE. The subscription information may include the maximum translation states the NAT64 node can allocate to the first UE.

F4. Receiving, from the subscription control node, a response message including subscription information of the first UE, the subscription information further including the maximum number of states that the NAT64 node can allocate to the first UE. The NAT64 may store or update the subscription information of the first UE.

F5. Retrieving the MaxNTS that the NAT64 node can allocate to the first UE from the stored or updated subscription information of the first UE. Retrieving the and the CNTS from the stored or updated subscription information for the first UE. If the subscription information for the first UE does not include a CNTS for the first UE, then the NAT64 node may initialise the CNTS for the first UE to be zero.

F6. Proceeding to perform step E3 using the retrieved MaxNTS and CNTS for the first UE.

Figures 4C, 4D:
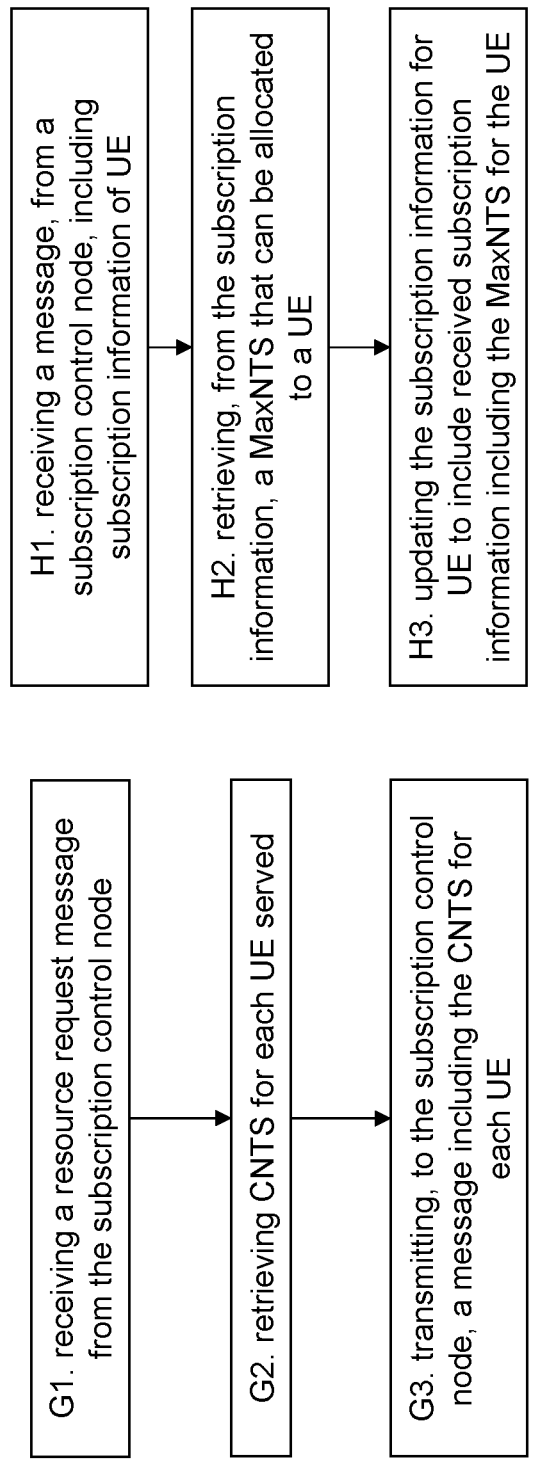
FIG. 4c illustrates schematically a further flow diagram of an example process for use by a NAT64 node according to embodiments of the present invention.
FIG. 4d illustrates schematically yet another flow diagram of an example process for use by a NAT64 node according to embodiments of the present invention.

FIG. 4c illustrates schematically a further flow diagram of an example process for use by a NAT64 node for interacting with a subscription control node (e.g. a PCRF node 101) for use in updating the subscription information associated with a first UE. The NAT64 node is in a communication network including a first UE. The NAT64 node includes a UE list of translation states for the first UE, in which each translation state is for use in translating IP addresses from a first type of IP address to a second type of IP address for data packets received from or transmitted to the first UE. The NAT64 node may perform, for each of multiple UEs, the steps including:

G1. receiving a resource request message from the subscription control node, the resource request message including a request for the CNTS of a first UE, or for several or multiple UEs. The request message may include an IP address associated with the first UE or UE(s).

G2. Retrieving the CNTS of the first UE or for several or multiple UEs. The retrieval may be based on using the IP address associated with each UE.

G3. Transmitting, to the subscription control node, a notification message including the CNTS for the first UE or the multiple UEs for use by the subscription control node in monitoring and controlling the NAT64 communication resources in the communication network.

FIG. 4d illustrates schematically yet another flow diagram of an example process for use by a NAT64 node in a communication network including a first UE. The NAT64 node includes a UE list of translation states for the first UE, in which each translation state is for use in translating IP addresses from a first type of IP address to a second type of IP address for data packets received from or transmitted to the first UE. The communication network may include a second NAT64 node, the second NAT64 node includes a second UE list of translation states for a first UE. The NAT64 node may perform the steps including:

H1. Receiving a update message including subscription information of the first UE. The subscription information of the first UE may include a new MaxNTS that the NAT64 node can use when allocating translation states to the first UE. The new MaxNTS may have been derived by the subscription control node based on the CNTS of the UE list associated with a first UE being served by the NAT64 node and a second CNTS of a second UE list associated with the first UE being served by the second NAT64 node.

H2. Retrieving from the subscription information of the first UE the MaxNTS that the NAT64 node can allocate to the first UE.

H3. Updating the subscription information associated with the first UE at the NAT64 node when the received MaxNTS is a new MaxNTS (i.e. is different to the current MaxNTS for the first UE) that the NAT64 node can allocate to the first UE.

Figure 5:
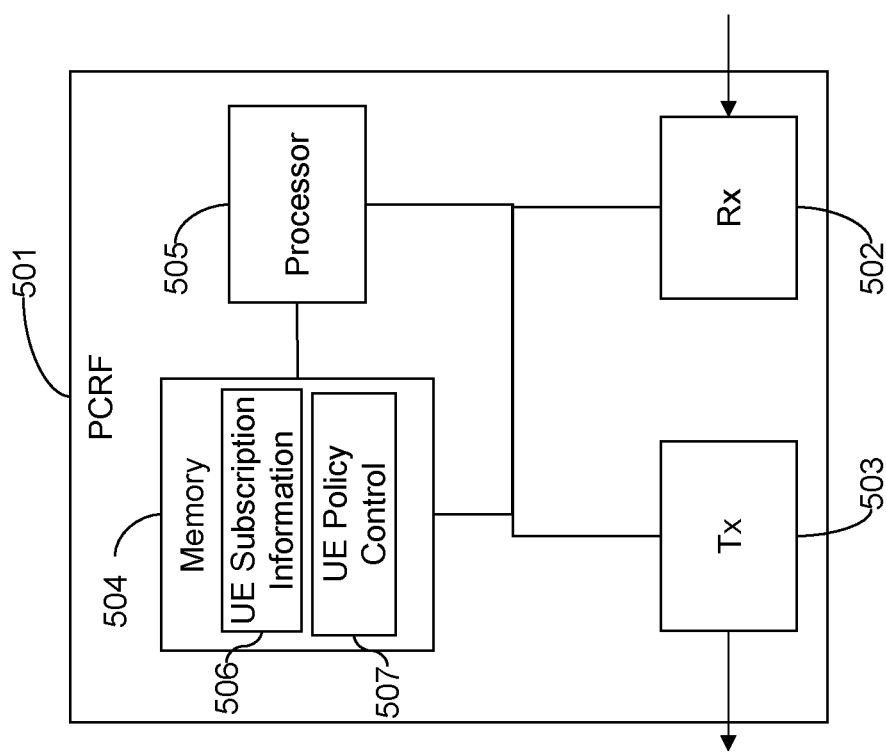
FIG. 5 illustrates schematically a subscription control node according to embodiments of the present invention.

FIG. 5 illustrates schematically an example of a policy or subscription control node 501, or a network node including PCC functionality (e.g. PCRF node 101), for use in implementing the methods, processes and/or the solutions as described. The policy or subscription control node 501 can be implemented as a combination of computer hardware and software, and can be configured to operate as an policy or subscription control node 501 in accordance with the solutions described above. The subscription control node 501 comprises a receiver 502, a transmitter 503, a memory 504 and a processor 505, which are connected together. The memory 504 stores the various programs/executable files that are implemented by the processor 505 and also provides a storage unit for any required data e.g. data representative of subscription information associated with one or more UEs and data representative of translation state lists for each of the one or more UEs, data representative of policy rules for implementing a plurality of policies for monitoring and controlling one or more NAT64 nodes and/or one or more DNS64 nodes. The programs/executable files stored in the memory 504, and implemented by processor 505, include one or more of, but are not limited to, a UE subscription information unit 506 and a UE policy control unit 507. The UE subscription information unit 506 is for determining the subscription information associated with one or more UEs, the subscription information for each UE may include translation state usage information associated with one or more of the NAT64 nodes servicing the corresponding UE(s). The UE policy control unit 507 may be a policy and/or analysis engine for monitoring and controlling one or more NAT64 nodes and DNS64 nodes based on the UE subscription information.

In operation, the processor 505, receiver 502 and transmitter 503 are configured to collect translation state usage information from each of the NAT64 nodes. The processor 505 is configured to identify a set of one or more UE(s) exceeding a maximum translation state usage allocated to each of the multiple UEs based on the corresponding subscription information and the collected translation state usage information. The processor 505 can also be configured to adjust the translation state usage information in the subscription information of the identified set of UE(s) to meet the maximum translation state usage for each UE, and update the corresponding subscription information. The transmitter 503 is further configured to transmit the updated subscription information of the identified set of UE(s) to the corresponding NAT64 nodes serving the identified set of UE(s).

The receiver may be configured to receive a request query from a first NAT64 node of the multiple NAT64 nodes for subscription information associated with a first UE of the multiple UEs. In response, the processor may be configured to retrieve the subscription information associated with the first UE and the transmitter may be configured to transmit the subscription information associated with the first UE to the first NAT64 node. The subscription information relates to NAT64 UE specific subscription information and includes the maximum number of translation states that the first NAT64 node may allocate to the first UE.

As the communication network further includes one or more DNS64 nodes the receiver 502 is further configured to receive, from a DNS64 node, a request for a prefix address list associated with a second UE of the multiple UEs for use in resolving a first type of IP address (e.g. IPv4 address) with a second type of IP address (e.g. IPv6 address) for the second UE. The subscription information may also relate to DNS64 UE specific subscription information and data representative of the prefix address list associated with one or more UE(s) such as the second UE. The processor 505 is configured to retrieve, from the subscription information for one or more of the UE(s), data representative of the prefix address list associated with the second UE. The transmitter is configured to transmit the data representative of the prefix address list associated with the second UE to the DNS64 node.

Figure 6:
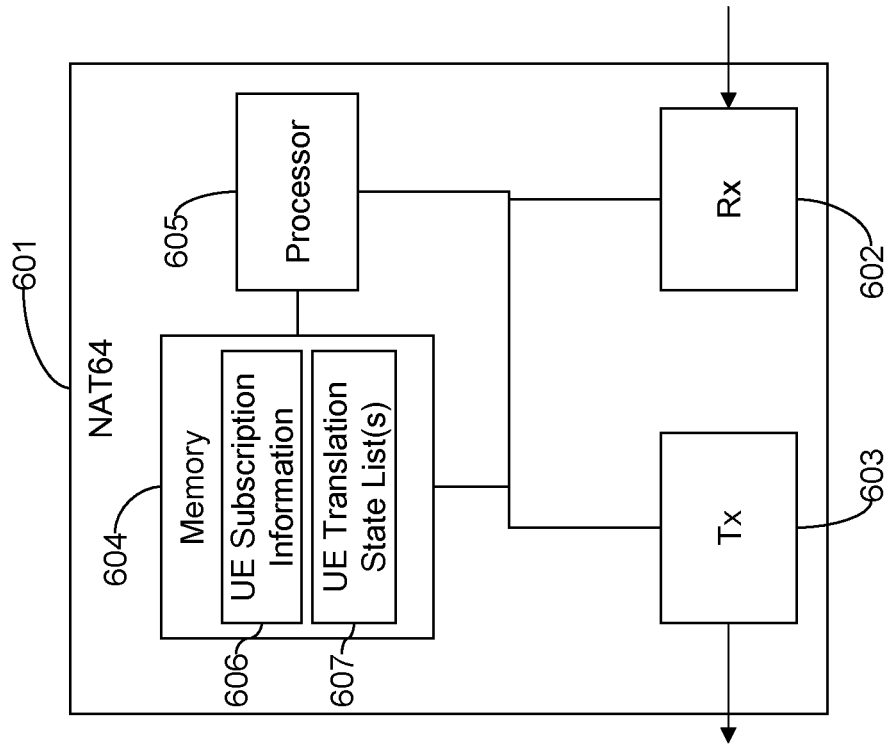
FIG. 6 illustrates schematically a NAT64 node according to embodiments of the present invention.

FIG. 6 illustrates schematically an example of a network node 601 including the functionality of a NAT64 node, for use in implementing the methods, processes and/or the solutions as described. The network node 601 can be implemented as a combination of computer hardware and software, and can be configured to operate as an NAT64 node in accordance with the solutions described above. The network node 601 comprises a receiver 602, a transmitter 603, a memory 604 and a processor 605, which are connected together. The memory 604 stores the various programs/executable files that are implemented by the processor 605 and also provides a storage unit for any required data e.g. data representative of UE subscription information and UE translation state lists. A UE translation state list or UE list of translation states for a first UE includes translation states, each translation state for use in translating IP addresses from a first type of IP address (e.g. IPv6) to a second type of IP address (e.g. IPv4) for data packets received from or transmitted to the first UE.

In operation, the receiver 602 is configured for receiving a data packet from the first UE, the data packet having a first type of IP address. The processor 605 is configured for translating the IP address of the data packet to a second type of IP address, when the IP address of the data packet corresponds to a translation state in the UE list. The processor 605 is further configured to determine if the current number of translation states in the UE list is less than a maximum number of translation states the NAT64 node 601 can allocate to the first UE when the IP address does not correspond to a translation state in the UE list. If the current number of translation states is less than the maximum number of translation states allowable for the first UE, then the processor 605 is further configured to create a new translation state corresponding to the IP address of the data packet and update the UE list when the current number of translation states is less than the maximum number of translation states. In addition, the processor 605 is configured to update the current number of translation states to include the new translation state. The transmitter 603 is further configured to transmit an update message to the subscription control node including an indication of the current number of translation states for the first UE for use in tracking the total number of translation states in use for the first UE.

The communications network may include further NAT64 nodes, such as a second NAT64 node, in which the second NAT64 node includes a second UE list of translation states for the first UE. The processor 605 and receiver 602 are further configured to receive a message including subscription information of the first UE from the subscription control node, the subscription information including a new maximum number of translation states that the NAT64 node can allocate to the first UE, the new maximum number of translation states having been derived from the current number of translation states of the UE list and the current number of translation states of the second UE list. The processor 605 is configured to update the maximum number of translation states of the UE list with the new maximum number of translation states.

Although the invention has been described in terms of example solutions or preferred embodiments as set forth above, it should be understood that these examples or embodiments are illustrative only and that the claims are not limited to only those examples or embodiments. Those skilled in the art will be able to make modifications and alternatives in view of the disclosure which are contemplated as falling within the scope of the appended claims. Each of the features, steps, or nodes disclosed or illustrated in the present specification may be incorporated into the invention, whether alone or in any appropriate combination with any other feature, step, or node disclosed or illustrated herein.

It will be appreciated by the person of skill in the art that various modifications may be made to the above described examples or embodiments and/or one or more features of the described examples or embodiments may be combined without departing from the scope of the present invention.

The invention claimed is:

1. A method for operating a Policy and Charging Resource Function (PCRF) node in a communications network, the communications network including multiple user equipments, UEs, and multiple network address translation 64, NAT64, nodes, the PCRF node including subscription information for one or more of the UEs, the subscription information for each UE including translation state usage information associated with one or more of the NAT64 nodes servicing that UE, wherein the subscription information is obtained from a Subscriber Policy Repository (SPR) node, the method comprising:
   collecting translation state usage information by receiving an update message from each of the NAT64 nodes, the update message indicating a current number of translation states each Nat64 node has allocated to each UE serviced by that NAT64 node;
   identifying a set of one or more UE(s) exceeding a maximum translation state usage allocated to each of the multiple UEs based on the corresponding subscription information and the collected translation state usage information;
   adjusting the translation state usage information in the subscription information of the identified set of UE(s) to meet the maximum translation state usage for each UE, and updating the corresponding subscription information; and
   transmitting the updated subscription information of the identified set of UE(s) to the corresponding NAT64 nodes.

2. The method as claimed in claim 1, wherein the step of collecting translation usage information further includes calculating, for each UE, a total number of translation states allocated to said each UE from the collected translation state usage information.

3. The method as claimed in claim 2, wherein the step of identifying the set of UE(s) further comprises including an second UE in the set of UE(s) when the total number of translation states for the second UE exceeds the maximum number of translation states allocated to the second UE.

4. The method as claimed in claim 1, wherein the step of adjusting the translation state usage information in the subscription information of the identified set of UE(s) further comprises adjusting the maximum number of translation states for each UE in the set of UE(s) that the corresponding NAT64 nodes can allocate for said each UE.

5. The method as claimed in claim 1, further comprising the steps of:
   receiving a request query from a first NAT64 node of the multiple NAT64 nodes for subscription information associated with a first UE of the multiple UEs; and
   transmitting the subscription information associated with the first UE to the first NAT64 node, the subscription information including the maximum number of translation states that the first NAT64 node may allocate to the first UE.

6. The method as claimed in claim 1, further comprising the steps of:
   transmitting a request query to the SPR node for subscription information associated with one or more of the multiple UEs; and
   receiving and storing the subscription information associated with the one or more of the multiple UEs.

7. The method as claimed in claim 1, wherein the communication network further comprises a Domain Name System, DNS, 64 node, the method including the steps of:
   receiving, from the DNS64 node, a request for a prefix address list associated with a third UE of the multiple UEs for use in resolving a first type of Internet Protocol (IP) address with a second type of IP address used in services requested by the third UE,
   retrieving, from the subscription information for one or more of the UEs, data representative of the prefix address list associated with the third UE; and
   retrieving, from the subscription information for one or more of the UEs, data representative of the prefix address list associated with the third UE; and
   transmitting the data representative of the prefix address list associated with the third UE to the DNS64 node.

8. The method as claimed in claim 7, wherein the step of retrieving further comprises:
   transmitting a request query to the SPR node for subscription information associated with the third UE;
   receiving and storing the subscription information associated with the third UE; and
   retrieving from the subscription information associated with the third UE the data representative of the prefix address list associated with the third UE.

9. The method as claimed in claim 1, further comprising transmitting the subscription information for the one or more of the UE(s) to associated NAT64 nodes.

10. The method as claimed in claim 1, further comprising transmitting the updated subscription information to the SPR node, the updated subscription information including adjusted translation state usage information for one or more UE(s).

11. The method or node as claimed in claim 1, wherein a first type of Internet Protocol (IP) address is an IP version 6, IPv6, address and a second type of IP address is an IP version 4, IPv4, address.

12. A Policy and Charging Resource Function (PCRF) node for use in a communications network, the communications network including multiple user equipments, UEs, and multiple network address translation 64, NAT64, nodes, the PCRF node comprising:
   a receiver, a transmitter, a memory unit, and processor, the processor being connected to the receiver, to the transmitter, and to the memory unit, wherein the memory unit includes storage for subscription information for one or more of the UEs, the subscription information for each UE including translation state usage information associated with one or more of the NAT64 nodes servicing the UE, wherein the subscription information is obtained from a Subscriber Policy Repository (SPR) node, wherein:
   the processor and transmitter are configured to collect translation state usage information by receiving an update message from each NAT64 node, the update message indicating a current number of translation states each NAT64 node has allocated to each UE serviced by that Nat64 node;
   the processor is further configured to:
      identify a set of one or more UE(s) exceeding a maximum translation state usage allocated to each of the multiple UEs based on the corresponding subscription information and the collected translation state usage information; and adjust the translation state usage information in the subscription information of the identified set of UE(s) to meet the maximum translation state usage for each UE, and updating the corresponding subscription information; and the transmitter is further configured to transmit the updated subscription information of the identified set of UE(s) to the corresponding NAT64 nodes.

13. The PCRF node as claimed in claim 12, wherein the processor, receiver and transmitter are further configured to:

receive a request query from a first NAT64 node of the multiple NAT64 nodes for subscription information associated with a first UE;

retrieve the subscription information associated with the first UE; and transmit the subscription information associated with the first UE to the first NAT64 node, the subscription information including the maximum number of translation states that the first NAT64 node may allocate to the first UE.

14. The PCRF node as claimed in claim 12, wherein the communication network further comprises a Domain Name System, DNS, 64 node, and the processor, transmitter and receiver are further configured to:

receive, from the DNS64 node, a request for a prefix address list associated with a second UE of the multiple UEs for use in resolving a first type of Internet Protocol (IP) address with a second type of IP address for the second UE;

retrieve, from the subscription information for one or more of the UEs, data representative of the prefix address list associated with the second UE; and transmit the data representative of the prefix address list associated with the second UE to the DNS64 node.

15. A non-transitory computer readable storage medium having stored thereon a set of computer executable instructions to be executed by a processor of a Policy and Charging Resource Function (PCRF) node in a communications network, the communications network including multiple user equipments, UEs, and multiple network address translation 64, NAT64, nodes, the PCRF node including subscription information for one or more of the UEs, the subscription information for each UE including translation state usage information associated with one or more of the NAT64 nodes servicing that UE, wherein the subscription information is obtained from a Subscriber Policy Repository (SPR) node, the set of computer executable instructions when executed by the processor of the PCRF node causes the processor to perform operations comprising:

collecting translation state usage information by receiving an update message from each of the NAT64 nodes, the update message indicating a current number of translation states each NAT64 node has allocated to each UE serviced by that NAT64 node;

identifying a set of one or more UE(s) exceeding a maximum translation state usage allocated to each of the multiple UEs;

adjusting the translation state usage information in the subscription information of the identified set of UE(s) to meet the maximum translation state usage for each UE, and updating the corresponding subscription information; and transmitting the updated subscription information of the identified set of UE(s) to the corresponding NAT64 nodes.

* * * * *